US010803870B2

(12) United States Patent
Je et al.

(10) Patent No.: US 10,803,870 B2
(45) Date of Patent: Oct. 13, 2020

(54) ELECTRONIC DEVICE PERFORMING OPERATION USING VOICE COMMAND AND METHOD OF OPERATING ELECTRONIC DEVICE

(71) Applicant: SAMSUNG ELECTRONICS CO., LTD., Suwon-si, Gyeonggi-do (KR)

(72) Inventors: Seongmin Je, Suwon-si (KR); Jaeyung Yeo, Seongnam-si (KR); Taekwang Um, Suwon-si (KR); Jungmin Cho, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 138 days.

(21) Appl. No.: 16/104,192

(22) Filed: Aug. 17, 2018

(65) Prior Publication Data

US 2019/0066689 A1 Feb. 28, 2019

(30) Foreign Application Priority Data

Aug. 22, 2017 (KR) .................. 10-2017-0106226

(51) Int. Cl.
*G10L 15/22* (2006.01)
*G10L 15/30* (2013.01)
(Continued)

(52) U.S. Cl.
CPC .............. *G10L 15/30* (2013.01); *G06F 3/167* (2013.01); *G10L 13/04* (2013.01); *G10L 15/22* (2013.01);
(Continued)

(58) Field of Classification Search
CPC ......... G10L 15/22; G10L 15/00; G10L 15/01; G10L 15/06; G10L 15/18; G10L 15/1815;
(Continued)

(56) References Cited

U.S. PATENT DOCUMENTS 9,972,318 B1 * 5/2018 Kelly ...................... G10L 15/22
10,091,545 B1 * 10/2018 Cwik ...................... G10L 15/26
(Continued)

OTHER PUBLICATIONS

Extended Search Report dated Nov. 6, 2018 in counterpart European Patent Application No. 18190004.4.
(Continued)

*Primary Examiner* — Qi Han
(74) *Attorney, Agent, or Firm* — Nixon & Vanderhye, P.C.

(57) ABSTRACT

Disclosed are an electronic device and a method of controlling an operation of the electronic device. A method comprises receiving first data related to an input comprising a request for performing a task using a second external device and obtained through a microphone and comprising information on a user interface of a first external device from the first external device, identifying a sequence of states of the second external device for executing the task based on at least some of the first data, transmitting first information on the sequence of states of the second external device to the second external device through the network interface, receiving second data indicative of a need for an additional input for completing the task from the second external device through the network interface, and transmitting second information to the first external device based on at least some of the second data.

18 Claims, 22 Drawing Sheets

(51) Int. Cl.
*G10L 13/04* (2013.01)
*G06F 3/16* (2006.01)
*H04L 29/08* (2006.01)
*H04L 12/28* (2006.01)

(52) U.S. Cl.
CPC .... *G10L 2015/223* (2013.01); *H04L 12/2816* (2013.01); *H04L 67/36* (2013.01)

(58) Field of Classification Search
CPC . G10L 15/1822; G10L 15/183; G10L 15/187; G10L 15/19; G10L 15/20; G10L 15/26; G10L 2015/223; G10L 2015/00; G10L 2015/06; G10L 2015/08; G10L 2015/228
USPC ..... 704/275, 270.1, 270, 276, 231, 235, 246
See application file for complete search history.

(56) References Cited

U.S. PATENT DOCUMENTS

| | | |
|---|---|---|
| 2009/0204410 A1 | 8/2009 | Mozer et al. |
| 2012/0209654 A1* | 8/2012 | Romagnino ............ G16H 40/20 705/7.27 |
| 2015/0235642 A1 | 8/2015 | Nishikawa et al. |
| 2016/0217785 A1 | 7/2016 | Kennewick et al. |

OTHER PUBLICATIONS

Examination Report dated Jul. 22, 2020 in counterpart Indian Patent Application No. 201824031324.

\* cited by examiner

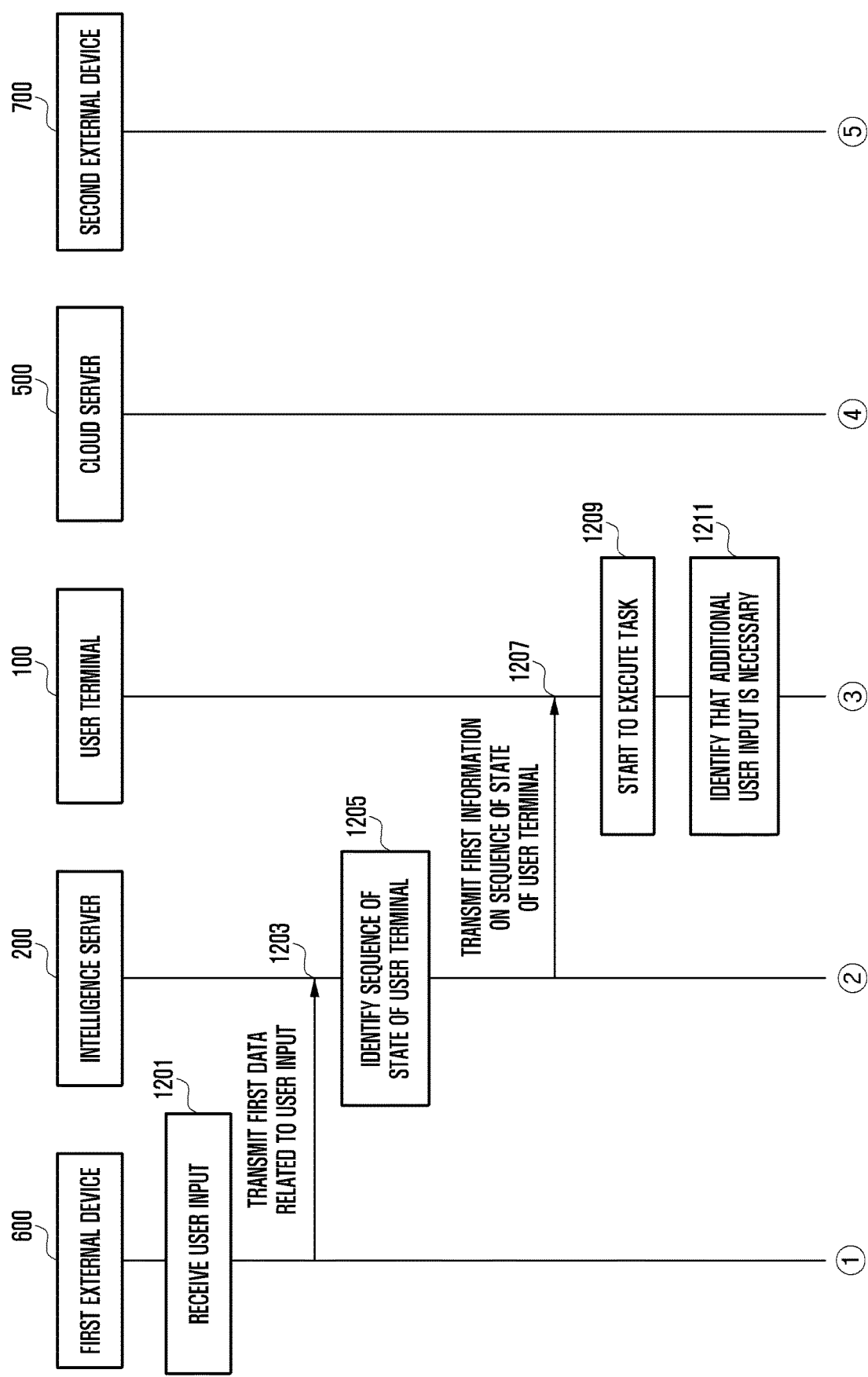

FIG. 13
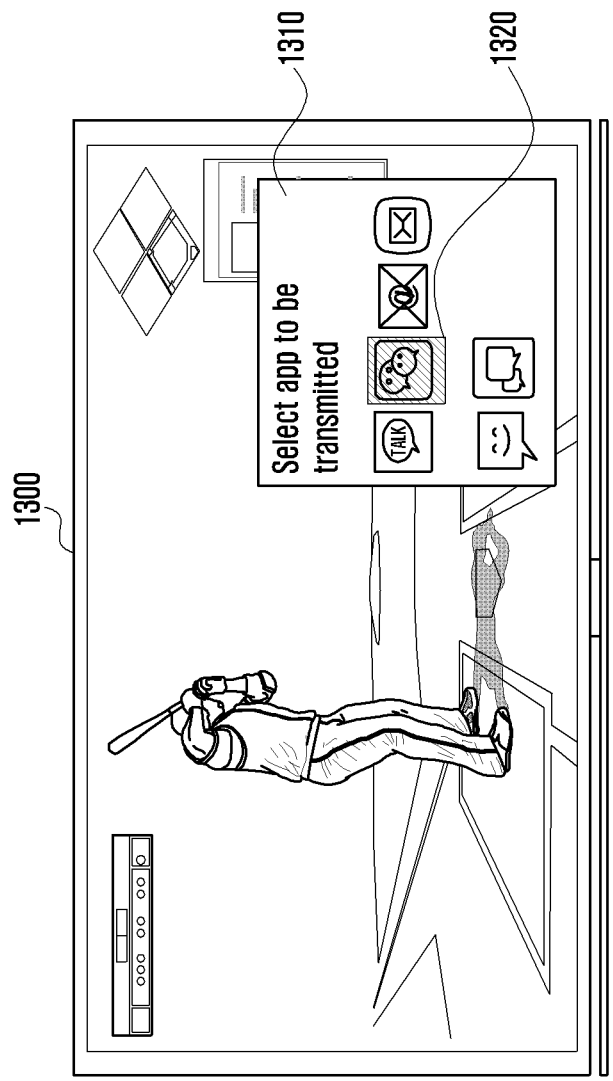
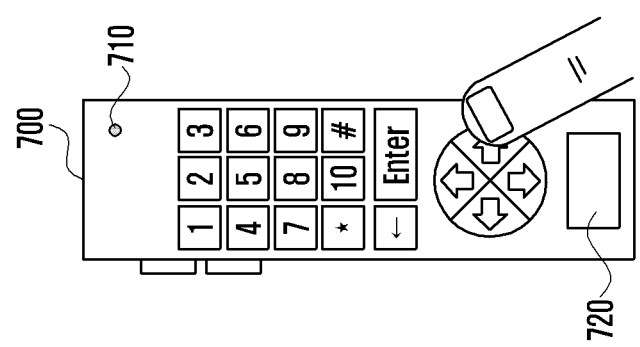

FIG. 14
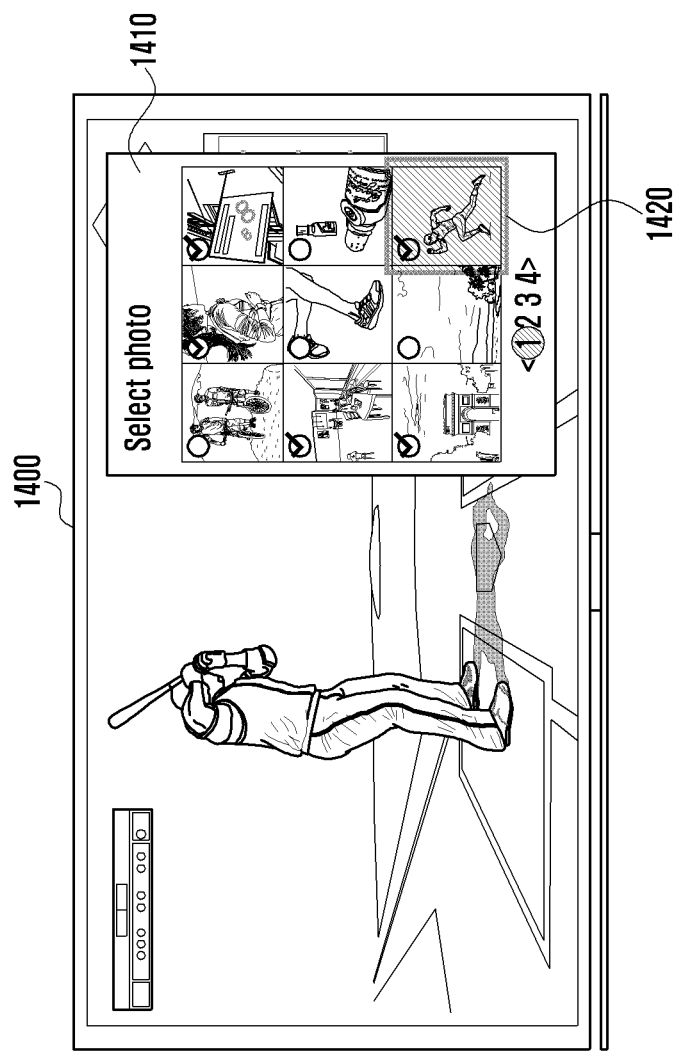
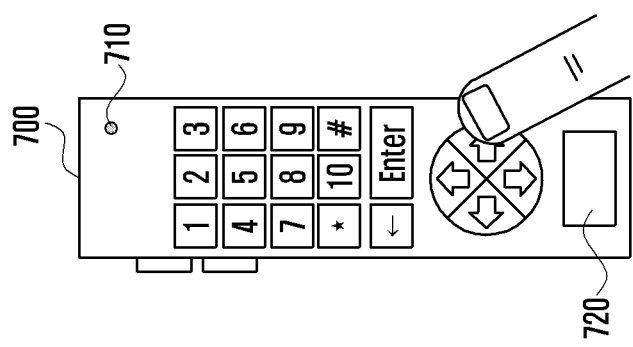

ELECTRONIC DEVICE PERFORMING OPERATION USING VOICE COMMAND AND METHOD OF OPERATING ELECTRONIC DEVICE

CROSS-REFERENCE TO RELATED APPLICATION

This application is based on and claims priority under 35 U.S.C. § 119 to Korean Patent Application No. 10-2017-0106226, filed on Aug. 22, 2017, in the Korean Intellectual Property Office, the disclosure of which is incorporated by reference herein in its entirety.

TECHNICAL FIELD

The disclosure relates to an electronic device performing an operation using a voice command and a method for the same to operate.

BACKGROUND

Various electronic devices, such as a smart phone, a tablet PC, a portable multimedia player (PMP), a personal digital assistant (PDA), a laptop personal computer (PC) and a wearable device, come into use.

A voice recognition function is recently applied to the electronic device. The user of the electronic device may execute various functions of the electronic device using his or her voice.

Furthermore, as the Internet of Things (IoT) in which devices used in a user's life environment are connected over a wired/wireless network and share information starts to be applied, an environment in which a voice command can be performed on different electronic devices connected over a network using various electronic devices, such as television and a refrigerator, is established.

Today an electronic device capable of performing a voice command has been implemented, but the execution of a user's voice command may be difficult if an electronic device that has received the voice command and an electronic device, that is, a target of control of the voice command, are different.

Furthermore, the execution of a user's voice command may be difficult if an electronic device that has received the voice command and an electronic device, that is, a target of control of the voice command, are physically far away from each other.

In order for an electronic device capable of performing a voice command to process a voice command, the electronic device may be configured to receive all parameters necessary for the voice command and then to process the voice command. In such a case, there are problems in that only the results of the processing of the voice command are output and various feedbacks for a process of processing the voice command cannot be provided. Furthermore, the processing speed taken for the voice command may be reduced.

SUMMARY

A system according to various embodiments of the present disclosure includes a network interface, at least one processor operatively connected to the network interface, and memory operatively connected to the processor. Wherein the memory may store instructions which, when executed by the processor, cause an electronic device (e.g., a server) to: receive first data related to an input including a request for performing a task using a second external device and obtained through a microphone and including information on a user interface of a first external device from a first external device including the microphone through the network interface, identify a sequence of states of the second external device for executing the task based on at least some of the first data, transmit first information on the sequence of the states of the second external device to the second external device through the network interface, receive second data indicative of a need for an additional input for completing the task from the second external device through the network interface, and transmit second information to a first external device based on at least some of the second data.

A method for an electronic device to operate according to various embodiments of the present disclosure may include operations comprising: receiving first data related to an input including a request for performing a task using a second external device and obtained through a microphone and including information on a user interface of a first external device from the first external device including the microphone through a network interface, identifying a sequence of states of the second external device for executing the task based on at least some of the first data, transmitting first information on the sequence of the states of the second external device to the second external device through the network interface, receiving second data indicative of a need for an additional input for completing the task from the second external device through the network interface, and transmitting second information to the first external device based on at least some of the second data.

An electronic device according to various embodiments of the present disclosure includes a network interface comprising network interface circuitry, a microphone, a fingerprint sensor, a speaker, a display, a processor operatively connected to the network interface, the microphone, the speaker, and the display, and a memory operatively connected to the processor. Wherein the memory may store instructions which, when executed by the processor, cause the electronic device to: receive a first input including a request to perform a task using an external device through the microphone, transmit first information related to the first input and including information on a user interface of the first external device to an external server through the network interface, receive second data indicative of a need for an additional input for completing the task from the external server, provide a voice through the speaker and/or provide a graphic user interface (GUI) through the display based on at least some of the second data, receive biometric information through the fingerprint sensor, compare the received biometric information with registered biometric information, receive a second input including the additional input for completing the task through the microphone and/or the display when the received biometric information and the registered biometric information are determined to be substantially identical, and transmit third data related to the second input to the external server through the network interface using a token corresponding to the registered biometric information.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 12A and 12B are flowcharts illustrating an embodiment if an additional user input is necessary in the integrated intelligence system according to another embodiment of the present disclosure;

FIGS. 13, 14, 15, 16 and 17 are diagrams illustrating embodiments in which an additional user input is performed using an external device in an electronic device according to various embodiments of the present disclosure.

DETAILED DESCRIPTION

Figure 1:
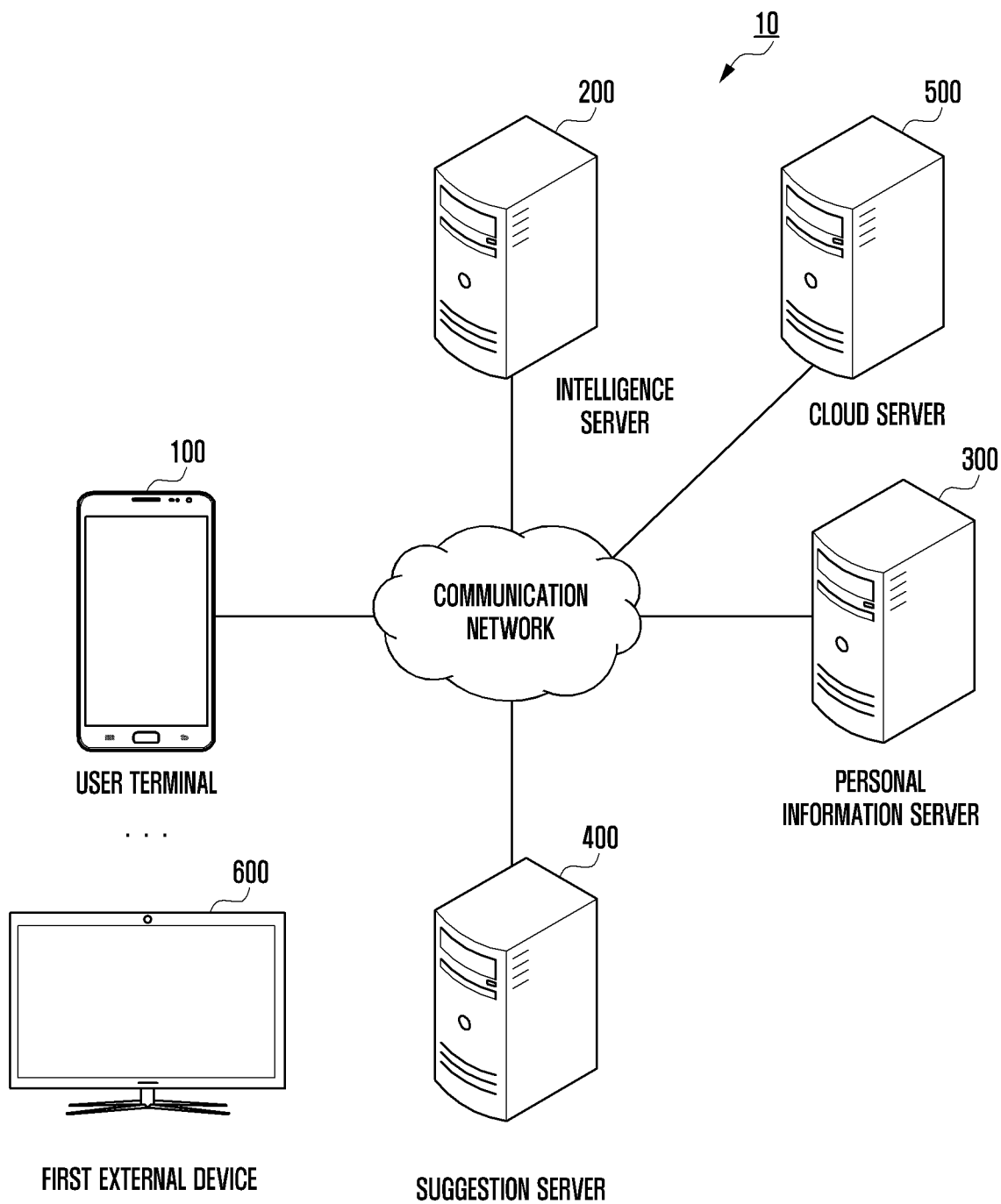
FIG. 1 is a diagram illustrating an integrated intelligence system according to various embodiments of the present disclosure.

The following description with reference to the accompanying drawings is provided to assist in a comprehensive understanding of various example embodiments of the disclosure. It includes various specific details to assist in that understanding but these are to be regarded merely as examples. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to their bibliographical meanings, but, are merely used to enable a clear and consistent understanding of the disclosure. Accordingly, it should be apparent to those skilled in the art that the following description of various example embodiments of the disclosure is provided for illustration purposes only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces.

The term "substantially" may generally refer to a recited characteristic, parameter, or value that need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

The expressions "include" and "may include" which may be used in the disclosure may refer, for example, to the presence of disclosed functions, operations, and elements but are not intended to limit one or more additional functions, operations, and elements. In the disclosure, the terms "include" and/or "have" may be understood to refer, for example, to a certain characteristic, number, operation, element, component or a combination thereof, but are not intended to be construed to exclude the existence of or a possibility of addition of one or more other characteristics, numbers, operations, elements, components or combinations thereof.

Furthermore, in the disclosure, the expression "and/or" includes any and all combinations of the associated listed words. For example, the expression "A and/or B" may include A, B, or both A and B.

In an embodiment of the disclosure, expressions including ordinal numbers, such as "first" and "second," and the like, may be used to describe various elements. However, such elements are not limited by the above expressions. For example, the above expressions do not limit the sequence and/or importance of the elements. The above expressions are used merely to distinguish an element from other elements. For example, a first user device and a second user device may refer to different user devices, but both of them are user devices. For example, a first element may be referred to as a second element, and similarly, a second element may also be referred to as a first element without departing from the scope of the disclosure.

In a case where a component is referred to as being "connected" to or "accessed" by another component, it is intended that not only the component is directly connected to or accessed by the other component, but also there may exist another component between them. In addition, in a case where a component is referred to as being "directly connected" to or "directly accessed" by another component, it is intended that there is no additional or other component therebetween.

An electronic device according to the disclosure may be a device including a communication function. For example, and without limitation, the device may correspond to a combination of at least one of a smartphone, a tablet personal computer (PC), a mobile phone, a video phone, an electronic-book (e-book) reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, a vacuum, an oven, a microwave, a washing machine, an air cleaner, and the like), an artificial intelligence robot, a television (TV), a digital versatile disc (DVD) player, an audio device, various medical devices (for example, a magnetic resonance angiography (MRA) device, a magnetic resonance imaging (MRI) device, a computed tomography (CT) device, a scanning machine, an ultrasonic wave device, and the like), a navigation device, a global positioning system (GPS) a receiver, an event data recorder (EDR), a flight data recorder (FDR), a set-top box, a TV box (for example, Samsung HomeSync®, Apple TV®, or Google TV™), an electronic dictionary, vehicle infotainment device, an electronic equipment for a ship (for example, navigation equipment for a ship, gyrocompass, and the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, or the like. It will be apparent to those skilled in the art that an electronic device according to the disclosure is not limited to the aforementioned devices.

FIG. 1 is a diagram illustrating an integrated intelligence system according to various embodiments of the present disclosure.

Referring to FIG. 1, the integrated intelligence system 10 may include a user terminal 100, an intelligence server 200, a personal information server 300 and/or a suggestion server 400, and a first external device 600. In accordance with an embodiment, the integrated intelligence system 10 may further include a cloud server 500.

The user terminal 100 may provide a user with a necessary service through an app (or an application program) (e.g., an alarm app, a message app or a photo (gallery) app) stored in the user terminal 100. For example, the user terminal 100 may execute and drive a different app through an intelligence app (or a voice recognition app) stored in the user terminal 100. The user terminal 100 may receive a user input for executing and driving the different app through the intelligence app of the user terminal 100. The user input may be received through a physical button, a touch pad, a voice input or a remote input, for example. In accordance with an embodiment, the user terminal 100 may correspond to various terminal devices (or electronic devices) capable of accessing the Internet, such as a mobile phone, a smartphone, a personal digital assistant (PDA) and a notebook computer.

In accordance with an embodiment, the user terminal 100 may receive a user's speech as a user input. The user terminal 100 may receive a user's speech and generate a command for driving an app based on the user's speech. Accordingly, the user terminal 100 may drive the app using the command.

The intelligence server 200 may receive a user voice input from an external device (e.g., the first external device 600 or the user terminal 100) over a communication network, and may change the user voice input into text data. In another embodiment, the intelligence server 200 may generate (or select) a path rule (e.g., the sequence of states of the user terminal 100) based on the text data. The path rule may include information on an action (or operation) for performing the function of an app or information on a parameter necessary to execute the operation. Furthermore, the path rule may include the sequence of operations of the app. The user terminal 100 may receive the path rule, may select the app based on the path rule, and may execute the operations included in the path rule in the selected app.

For example, the user terminal 100 may execute the operation, and may display a screen corresponding to the state of the user terminal 100 that has executed the operation on the display. For another example, the user terminal 100 may execute the operation, and may not display the results of the execution of the operation on the display. For example, the user terminal 100 may execute a plurality of operations and display only the results of some of the plurality of operations on the display. For example, the user terminal 100 may display only the results of the execution of an operation in the last sequence on the display. For another example, the user terminal 100 may receive a user's input and display the results of the execution of an operation on the display.

In accordance with various embodiments of the present disclosure, when partial landing (e.g., shortage of parameter information) occurs in the user terminal 100, the intelligence server 200 may identify an external device that belongs to external devices and that will perform an operation of receiving a user input for inputting a deficient parameter. Alternatively, when partial landing occurs in the user terminal 100, the intelligence server 200 may identify an external device that belongs to external devices and that will transmit a user interface for a user input for inputting a deficient parameter.

The personal information server 300 may include a database in which user information is stored. For example, the personal information server 300 may receive user information (e.g., context information or app execution) from the user terminal 100 and store the user information in the database. The intelligence server 200 may receive the user information from the personal information server 300 over a communication network, and may use the received user information when it generates a path rule for a user input. In accordance with an embodiment, the user terminal 100 may receive user information from the personal information server 300 over a communication network, and may use the received user information as information for managing the database.

The suggestion server 400 may include a database in which information on the instruction of a function or application within a terminal or a function to be provided is stored. For example, the suggestion server 400 may include a database in which functions capable of being used by a user based on user information of the user terminal 100 received from the personal information server 300 are stored. The user terminal 100 may receive information on the function to be provided from the suggestion server 400 over a communication network, and may provide the information to the user.

The integrated intelligence system 10 according to various embodiments of the present disclosure may further include the cloud server 500.

The cloud server 500 may perform various functions.

In accordance with various embodiments of the present disclosure, the cloud server 500 may store information of authenticated external devices (e.g., the first external device 600 or the user terminal 100). The cloud server 500 may receive a user's location from authenticated external devices every set time or in real time.

In accordance with various embodiments of the present disclosure, the cloud server 500 may determine that data received from the intelligence server 200 will be transmitted to which device. In accordance with various embodiments of the present disclosure, if the user terminal 100 does not have parameter information for performing a task while performing the task, the execution of the task may be stopped. The state in which the execution of a task has been stopped due to the shortage of parameter information may be referred, for example, to as partial landing. The cloud server 500 according to various embodiments of the present disclosure may receive information of partial landing from the intelligence server 200. The information of partial landing may include information indicative of the state in which the task execution of the user terminal 100 has been subjected to partial landing and the characteristics of a parameter necessary to complete the task execution of the user terminal 100. The cloud server 500 may determine that data received from the intelligence server 200 will be transmitted to which first external device 600 based on at least one of information of authenticated external devices (e.g., an IP address, MAC address or unique identifier information of the first external device 600 or the user terminal 100), the characteristics of a parameter, and a user location. In accordance with various embodiments of the present disclosure, if the cloud server 500 determine that it will transmit data received from the intelligence server 200 to which device, the intelligence server 200 may transmit the data to the cloud server 500, and may identify that it will not transmit the data to which device.

In accordance with various embodiments of the present disclosure, the intelligence server 200 may transmit information of partial landing to the cloud server 500. In accordance with various embodiments of the present disclosure, the cloud server 500 may generate a user interface (e.g., a UI screen and voice data) for receiving parameter information with respect to a user, and may transmit the generated user interface to the first external device 600. In accordance with various embodiments of the present disclosure, the user interface for receiving a parameter from a user may be generated by the intelligence server 200. If the user interface is generated by the intelligence server 200, the cloud server 500 may receive the user interface from the intelligence server 200 and transmit the user interface to the first external device 600.

The first external device 600 may refer, for example, to various electronic devices. The first external device 600 according to various embodiments of the present disclosure may receive a user input, and may transmit data related to the user input to the intelligence server 200 through a network interface. The first external device 600 according to various embodiments of the present disclosure may include a microphone (or mike) and receive a user input using the microphone. When data is received from the intelligence server 200 or the cloud server 500, the first external device 600 may generate or output various user interfaces in which an additional user input may be performed based on the received data. In accordance with various embodiments of the present disclosure, if the first external device 600 is identified to be a device that will output a user interface capable of performing an additional user input, the first external device 600 may output the user interface capable of performing the additional user input.

The first external device 600 according to various embodiments of the present disclosure may support the Internet on things (IoT) in which it may be connected to various devices in a wired/wireless manner over a communication network. The first external device 600 according to various embodiments of the present disclosure may refer, for example, to various electronic devices equipped with microphones. The first external device 600 according to another embodiment of the present disclosure may not include at least one of a display and a speaker. The first external device 600 according to various embodiments of the present disclosure may operate in conjunction with the intelligence server 200 or the cloud server 500. To this end, the first external device 600 may support the IoT.

Although not shown in FIG. 1, the integrated intelligence system 10 according to various embodiments of the present disclosure may further include a second external device (not shown).

The second external device may refer, for example, to an electronic device having a user interface different from that of the first external device. The second external device may operate in conjunction with the intelligence server 200 or the cloud server 500 using various communication means.

The integrated intelligence system 10 according to various embodiments of the present disclosure may differently configure a device (e.g., the first external device 600) that receives a user's first speech and a device (e.g., the second external device) that outputs a user interface for receiving an additional parameter to a user. The intelligence server 200 or the cloud server 500 may identify a device that outputs a user interface for receiving an additional parameter by taking into consideration the characteristics of the additional parameter, the characteristics of authenticated external devices, and a user's location.

The integrated intelligence system 10 according to various embodiments of the present disclosure may differently configure a device (e.g., the second external device) that outputs a user interface for receiving an additional parameter to a user and a device that receives an additional parameter. The intelligence server 200 or the cloud server 500 may identify a device that receives an additional parameter by taking into consideration the characteristics of an additional parameter, the characteristics of authenticated external devices and a user's location.

Figure 2:
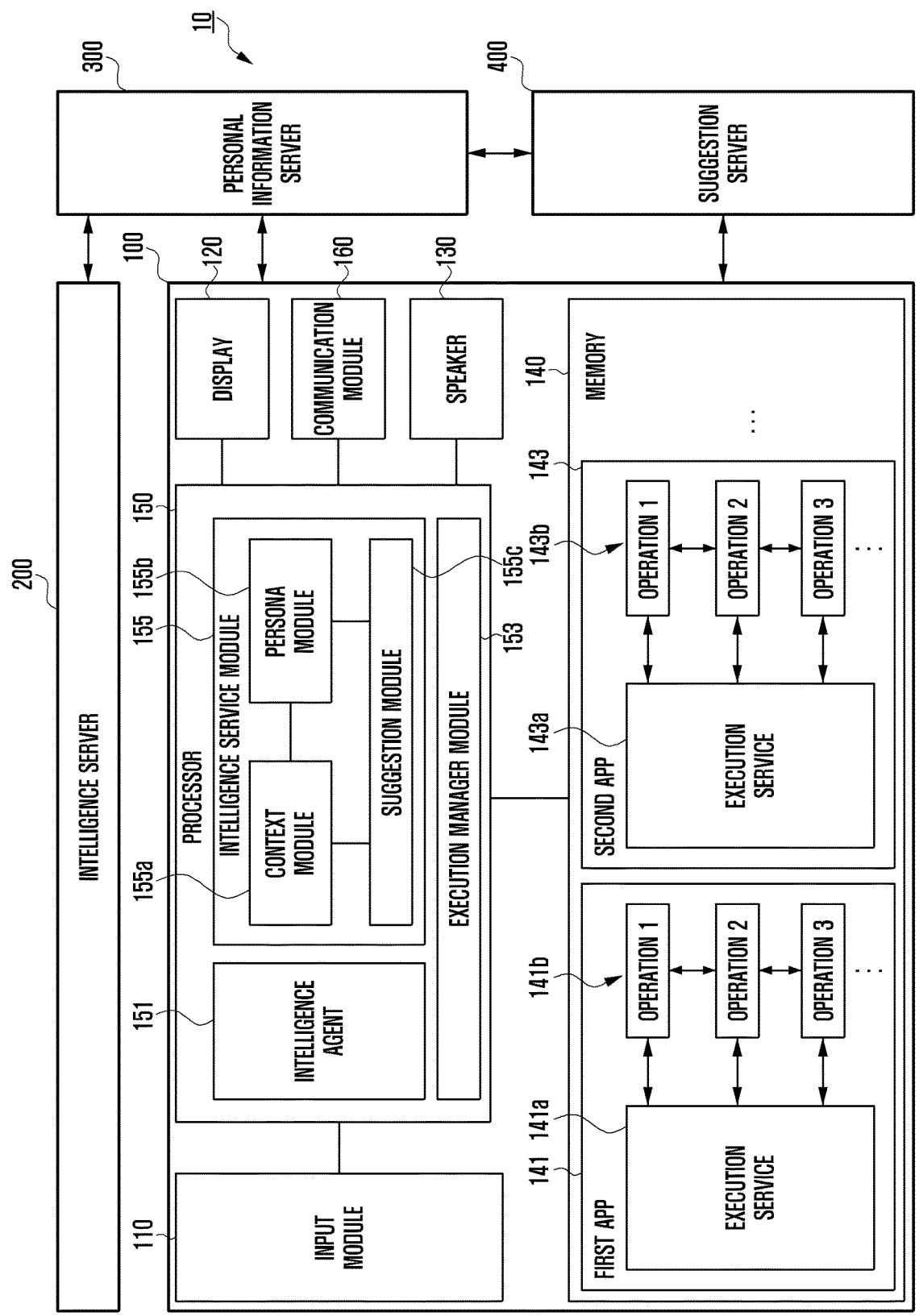
FIG. 2 is a block diagram illustrating a user terminal of the integrated intelligence system according to an embodiment of the present disclosure.

FIG. 2 is a block diagram illustrating the user terminal of the integrated intelligence system according to an embodiment of the present disclosure.

Referring to FIG. 2, the user terminal 100 may include an input module (e.g., including input circuitry) 110, a display 120, a speaker 130, memory 140, a processor (e.g., including processing circuitry and/or program elements) 150 and/or a communication module (e.g., including communication circuitry) 160. The user terminal 100 may further include a housing. The elements of the user terminal 100 may be seated in the housing or may be positioned on the housing.

The input module 110 according to an embodiment may receive a user input from a user. For example, the input module 110 may receive a user input from an external device (e.g., a keyboard or a headset) connected thereto. For another example, the input module 110 may include various input circuitry, such as, for example, and without limitation, a touch screen (e.g., a touch screen display) combined with the display 120, or the like. For yet another example, the input module 110 may include input circuitry, such as, for example, and without limitation, a hardware key (e.g., 112 of FIG. 3) (or a physical key) positioned in the user terminal 100 (or the housing of the user terminal 100), or the like.

In accordance with an embodiment, the input module 110 may include a microphone (e.g., 111 of FIG. 3) capable of receiving a user's speech as a voice signal. For example, the input module 110 includes a voice input system, and may receive a user's speech as a voice signal through the voice input system.

The display 120 according to an embodiment may display an execution screen of an image or video and/or an application. For example, the display 120 may display the graphic user interface (GUI) of an app.

In accordance with an embodiment, the speaker 130 may output a voice signal. For example, the speaker 130 may output a voice signal, generated in the user terminal 100, to the outside.

In accordance with an embodiment, the memory 140 may store a plurality of applications (e.g., apps) 141 and 143. The plurality of apps 141 and 143 stored in the memory 140 may be selected and executed in response to a user input, and may operate.

In accordance with an embodiment, the memory 140 may include a database (not shown) capable of storing information necessary to recognize a user input. For example, the memory 140 may include a log database capable of storing log information. For another example, the memory 140 may include a persona database capable of storing user information.

In accordance with an embodiment, the memory 140 may store the plurality of apps 141 and 143. The plurality of apps 141 and 143 may be loaded and operate. For example, the plurality of apps 141 and 143 stored in the memory 140 may be loaded by the execution manager module (e.g., including various processing circuitry and/or program elements) 153 of the processor 150, and may operate. The plurality of apps 141 and 143 may include execution services 141*a* and 143*a* or a plurality of operations (or unit operations) 141*b* and 143*b* that perform functions. The execution services 141*a* and 143*a* may be generated by the execution manager module 153 of the processor 150, and may execute the plurality of operations 141*b* and 143*b*.

In accordance with an embodiment, when the operations 141*b* and 143*b* of the apps 141 and 143 are executed, an execution state screen according to the execution of the operations 141*b* and 143*b* may be displayed on the display 120. The execution state screen may be a screen of the state in which the operations 141*b* and 143*b* have been completed, for example. For another example, the execution state screen may be a screen in which the execution of the operations 141*b* and 143*b* has been subjected to partial landing (e.g., if a parameter necessary for the operations 141*b* and 143*b* has not been received).

The execution services 141*a* and 143*a* according to an embodiment may include various processing circuitry and/or program elements and execute the operations 141*b* and 143*b* according to a path rule. For example, the execution services 141*a* and 143*a* may be executed by the execution manager module 153, may receive a execution request according to a path rule from the execution manager module 153, and may execute the operations 141*b* and 143*b* of the apps 141 and 143 in response to the execution request. When the execution of the operations 141*b* and 143*b* is completed, the execution services 141*a* and 143*a* may transmit completion information to the execution manager module 153.

In accordance with an embodiment, when the plurality of operations 141*b* and 143*b* is executed in the apps 141 and 143, they may be sequentially executed. When the execution of one operation (operation 1) is completed, the execution services 141*a* and 143*a* may open a next operation (operation 2) and transmit the completion information to the execution manager module 153. In this case, opening a given operation may be understood that the given operation shifts to an executable state or the execution of the given operation is prepared. In other words, when a given operation is not open, the corresponding operation cannot be executed. When the completion information is received, the execution manager module 153 may transmit an execution request for next operations 141*b* and 143*b* to an execution service (e.g., operation 2). In accordance with an embodiment, when the plurality of apps 141 and 143 is executed, they may be sequentially executed. For example, when the execution of the last operation of the first app 141 is completed and completion information is received, the execution manager module 153 may transmit an execution request for the first operation of the second app 143 to the execution service 143*a*.

In accordance with an embodiment, if the plurality of operations 141*b* and 143*b* has been executed in the apps 141 and 143, result screens based on the execution of the plurality of operations 141*b* and 143*b* may be displayed on the display 120. In accordance with an embodiment, only some of a plurality of result screens according to the execution of the plurality of operations 141*b* and 143*b* may be displayed on the display 120.

In accordance with an embodiment, the memory 140 may store an intelligence app (e.g., a voice recognition app) operating in conjunction with the intelligence agent (e.g., including various processing circuitry and/or program elements) 151. The app operating in conjunction with the intelligence agent 151 may receive a user's speech as a voice signal and process the voice signal. In accordance with an embodiment, the app operating in conjunction with the intelligence agent 151 may be driven in response to a specific input (e.g., an input through a hardware key, an input through a touch screen or a specific voice input) received through the input module 110.

In accordance with an embodiment, the processor 150 may include various processing circuitry and/or program elements and control an overall operation of the user terminal 100. For example, the processor 150 may control the input module 110 to receive a user input. The processor 150 may control the display 120 to display an image. The processor 150 may control the speaker 130 to output a voice signal. The processor 150 may control the memory 140 to fetch or store required information.

In accordance with an embodiment, the processor 150 may include an intelligence agent (e.g., including various processing circuitry and/or program elements) 151, the execution manager module (e.g., including various processing circuitry and/or program elements) 153 and/or an intelligence service module (e.g., including various processing circuitry and/or program elements) 155. In an example embodiment, the processor 150 may drive the intelligence agent 151, the execution manager module 153 or the intelligence service module 155 by executing instructions stored in the memory 140. Several modules described in various embodiments of the present disclosure may be implemented using hardware or software. In various embodiments of the present disclosure, an operation executed by the intelligence agent 151, the execution manager module 153 or the intelligence service module 155 may be construed as being an operation executed by the processor 150.

The intelligence agent 151 according to an embodiment may generate a command for driving an app based on a voice signal received as a user input. The execution manager module 153 according to an embodiment may receive the generated command from the intelligence agent 151, may select the apps 141 and 143 stored in the memory 140, and may execute and drive the selected apps. In accordance with an embodiment, the intelligence service module 155 may manage a user's information and use it to process a user input.

The intelligence agent 151 may transmit a user input, received through the input module 110, to the intelligence server 200 so that the user input is processed.

In accordance with an embodiment, the intelligence agent 151 may pre-process a user input before it transmits the user input to the intelligence server 200. In accordance with an embodiment, the intelligence agent 151 may include an adaptive echo canceller (AEC) module, a noise suppression (NS) module, an end-point detection (EPD) module or an automatic gain control (AGC) module in order to pre-process the user input. The AEC module may remove echo included in the user input. The NS module may suppress background noise included in the user input. The EPD module may find a portion including a user voice by detecting the end of the user voice included in the user input. The AGC module may adjust the volume of a user input so that the user input is suitable for being recognized and processed. In accordance with an embodiment, the intelligence agent 151 may include all of the pre-processing elements for performance. In another embodiment, the intelligence agent 151 may include some of the pre-processing elements in order to operate with low energy.

In accordance with an embodiment, the intelligence agent 151 may include a wakeup recognition module configured to recognize a user's calling. The wakeup recognition module may recognize a user's wakeup command through the voice recognition module. When the wakeup command is received, the wakeup recognition module may activate the intelligence agent 151 so as to receive a user input. In accordance with an embodiment, the wakeup recognition module of the intelligence agent 151 may be implemented in a low energy processor (e.g., a processor included in an audio codec). In accordance with an embodiment, the intelligence agent 151 may be activated in response to a user input through a hardware key. When the intelligence agent 151 is activated, an intelligence app (e.g., a voice recognition app) operating in conjunction with the intelligence agent 151 may be executed.

In accordance with an embodiment, the intelligence agent 151 may include a voice recognition module for executing a user input. The voice recognition module may recognize a user input for enabling an operation to be executed in an app. For example, the voice recognition module may recognize a limited user (or voice) input (e.g., speech, such as "click" that executes a photographing operation when a camera app is executed) that executes an operation, such as a wakeup command in the apps 141 and 143. The voice recognition module configured to recognize a user input by assisting the intelligence server 200 may recognize a user command that may be processed in the user terminal 100, for example, and may rapidly process the user command. In accordance with an embodiment, the voice recognition module for executing the user input of the intelligence agent 151 may be implemented in the app processor.

In accordance with an embodiment, the voice recognition module (including the voice recognition module of the wakeup module) of the intelligence agent 151 may recognize a user input using an algorithm for recognizing a voice. The algorithm used to recognize the voice may, for example, and without limitation, be any one of a hidden Markov model (HMM) algorithm, an artificial neural network (ANN) algorithm and/or a dynamic time warping (DTW) algorithm, or the like.

In accordance with an embodiment, the intelligence agent 151 may convert a user's voice input into text data. In accordance with an embodiment, the intelligence agent 151 may transfer a user's voice to the intelligence server 200 and receive converted text data. Accordingly, the intelligence agent 151 may display the text data on the display 120.

In accordance with an embodiment, the intelligence agent 151 may receive a path rule transmitted by the intelligence server 200. In accordance with an embodiment, the intelligence agent 151 may transmit the path rule to the execution manager module 153.

In accordance with an embodiment, the intelligence agent 151 may transmit an execution result log according to a path rule, received from the intelligence server 200, to the intelligence service module 155. The transmitted execution result log may be accumulated and managed in the user's preference information of a persona module (or persona manager) 155*b*.

The execution manager module 153 according to an embodiment may receive a path rule from the intelligence agent 151, may execute the apps 141 and 143, so the apps 141 and 143 execute the operations 141*b* and 143*b* included in the path rule. For example, the execution manager module 153 may transmit command information for executing the operations 141*b* and 143*b* to the apps 141 and 143, and may receive completion information of the operations 141*b* and 143*b* from the apps 141 and 143.

In accordance with an embodiment, the execution manager module 153 may transmit/receive command information for executing the operations 141*b* and 143*b* of the apps 141 and 143 between the intelligence agent 151 and the apps 141 and 143. The execution manager module 153 may bind the apps 141 and 143 to be executed according to the path rule, and may transmit the command information of the operations 141*b* and 143*b* included in the path rule to the apps 141 and 143. For example, the execution manager module 153 may sequentially transmit the operations 141*b* and 143*b* included in the path rule to the apps 141 and 143, so the operations 141*b* and 143*b* of the apps 141 and 143 are sequentially executed according to the path rule.

In accordance with an embodiment, the execution manager module 153 may manage the execution state of the operations 141*b* and 143*b* of the apps 141 and 143. For example, the execution manager module 153 may receive information on the execution state of the operations 141*b* and 143*b* from the apps 141 and 143. If the execution state of the operations 141*b* and 143*b* is partial landing, for example (e.g., if a parameter necessary for the operations 141*b* and 143*b* has not been received), the execution manager module 153 may transmit information on the partial landing to the intelligence agent 151. The intelligence agent 151 may request the input of required information (e.g., parameter information) from a user using the received information. If the execution state of the operations 141*b* and 143*b* is an operating state, for another example, the intelligence agent 151 may receive a speech from a user. The execution manager module 153 may transmit information on the executed apps 141 and 143 and the execution state of the apps 141 and 143 to the intelligence agent 151. The intelligence agent 151 may receive parameter information of the user's speech through the intelligence server 200, and may transmit the received parameter information to the execution manager module 153. The execution manager module 153 may change the parameter of the operations 141*b* and 143*b* into a new parameter using the received parameter information.

In accordance with an embodiment, the execution manager module 153 may transfer parameter information, included in a path rule, to the apps 141 and 143. When the plurality of apps 141 and 143 is sequentially executed according to the path rule, the execution manager module 153 may transfer the parameter information included in the path rule from one app to the other app.

In accordance with an embodiment, the execution manager module 153 may receive a plurality of path rules. The execution manager module 153 may select a plurality of path rules based on a user's speech. For example, if a user's speech has specified some app 141 that will execute some operation 141*a*, but has not specified other apps 143 that will execute the remaining operations 143*b*, the execution manager module 153 may receive a plurality of different path rules on which the same app 141 (e.g., a gallery app) that will execute some operation 141*a* is executed and other apps 143 (e.g., a message app and a Telegram app) that will execute the remaining operations 143*b* are separately executed. For example, the execution manager module 153 may execute the same operations 141*b* and 143*b* (e.g., the contiguous and identical operations 141*b* and 143*b*) of the plurality of path rules. If up to the same operation has been executed, the execution manager module 153 may display a state screen in which different apps 141 and 143 included in the plurality of path rules may be selected on the display 120.

In accordance with an embodiment, the intelligence service module 155 may include the context module 155*a*, the persona module 155*b* or a suggestion module 155*c*.

The context module 155*a* may include various processing circuitry and/or program elements and collect the current states of the apps 141 and 143 from the apps 141 and 143. For example, the context module 155*a* may collect the current states of the apps 141 and 143 by receiving context information indicative of the current states of the apps 141 and 143.

The persona module 155*b* may include various processing circuitry and/or program elements and manage personal information of a user who uses the user terminal 100. For example, the persona module 155*b* may collect use information and the results of the execution of the user terminal 100 and manage the personal information of the user.

The suggestion module 155*c* may include various processing circuitry and/or program elements and predict a user's intent and recommend the intent to the user. For example, the suggestion module 155*c* may recommend a command to the user by taking into consideration the current state (e.g., time, a place, a situation or an app) of the user.

The communication module 160 may include various communication circuitry and transmit or receive data to or from the intelligence server 200, the personal information server 300, the suggestion server 400, the cloud server (e.g., 500 FIG. 1) or the first external device 600. In accordance with various embodiments of the present disclosure, if partial landing occurs due to the shortage of information of parameters used for task execution during the task execution, a user terminal (e.g., the user terminal 100 of FIG. 1) may transmit information on the partial landing to the intelligence server 200.

In accordance with various embodiments of the present disclosure, information on a deficient parameter may be received from the first external device 600. The intelligence server 200 may receive information on a deficient parameter from the cloud server 500 or the first external device 600, and may generate a new path rule based on the information on a deficient parameter. The user terminal 100 may receive the generated path rule using the communication module 160. The user terminal 100 may execute a task using the generated path rule and deviate from partial landing.

Figure 3:
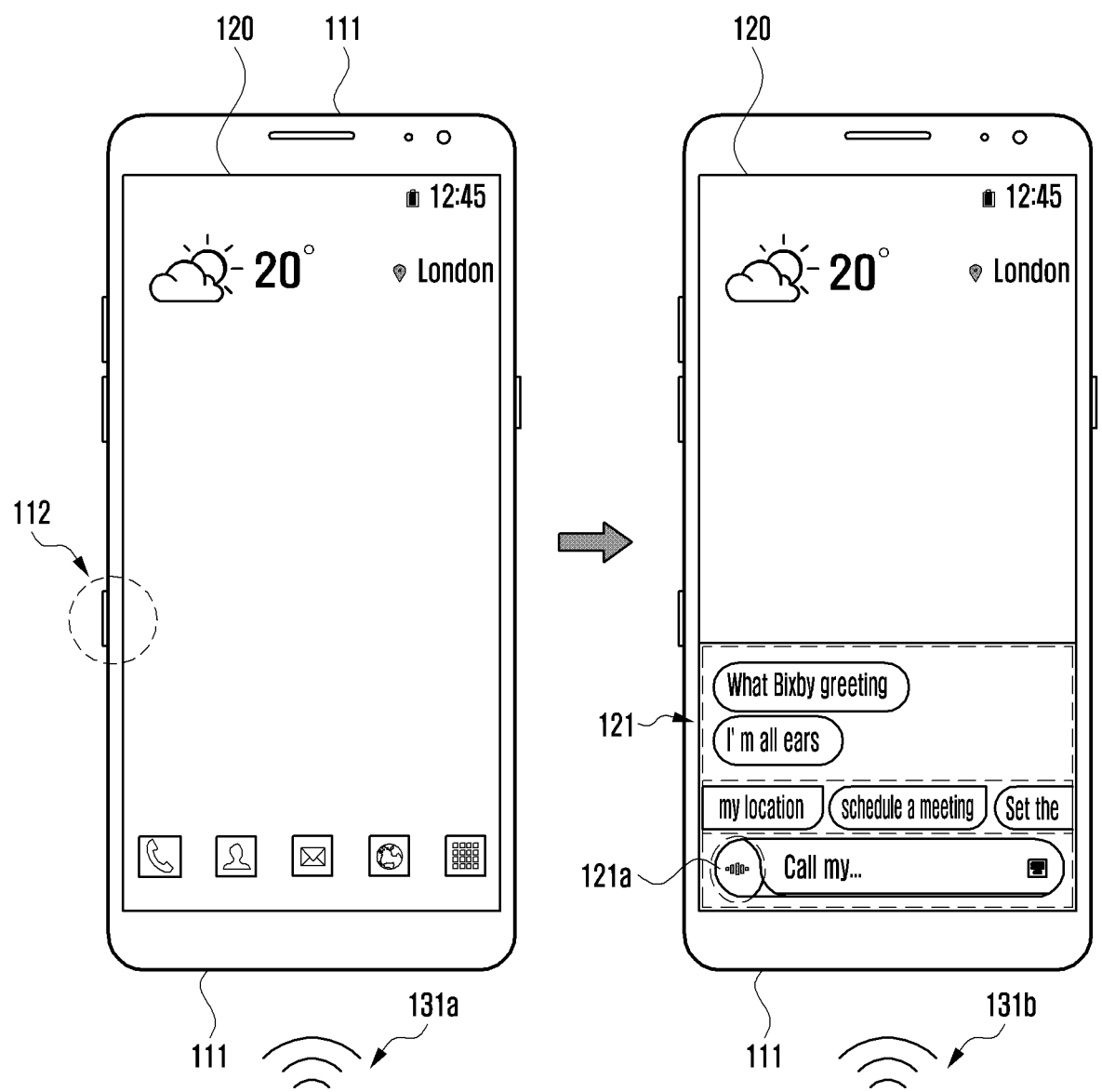
FIG. 3 is a diagram illustrating that the intelligence app of a user terminal according to an embodiment of the present disclosure is executed.

FIG. 3 is a diagram illustrating that the intelligence app of a user terminal according to an embodiment of the present disclosure is executed.

FIG. 3 illustrates an example in which a user terminal (e.g., the user terminal 100 of FIG. 1) receives a user input and executes an intelligence app (e.g., a voice recognition app) operating in conjunction with the intelligence agent 151.

In accordance with an embodiment, the user terminal 100 may execute the intelligence app for enabling a voice to be recognized through the hardware key 112. For example, when a user input is received through the hardware key 112, the user terminal 100 may display the user interface (UI) 121 of the intelligence app on the display 120. For example, a user may touch a voice recognition button 121*a* in the UI 121 of the intelligence app in order to input (131*b*) a voice in the state in which the UI 121 of the intelligence app has been displayed on the display 120. For another example, a user may input (131*b*) a voice by continuing to press the hardware key 112 in order to input (131*b*) the voice.

In accordance with an embodiment, the user terminal 100 may execute the intelligence app for recognizing voice through the microphone 111. For example, when a selected voice (e.g., Hey Galaxy! Bixby! or wake up!) is received (131*a*) through the microphone 111, the user terminal 100 may display the UI 121 of the intelligence app on the display 120.

Figure 4:
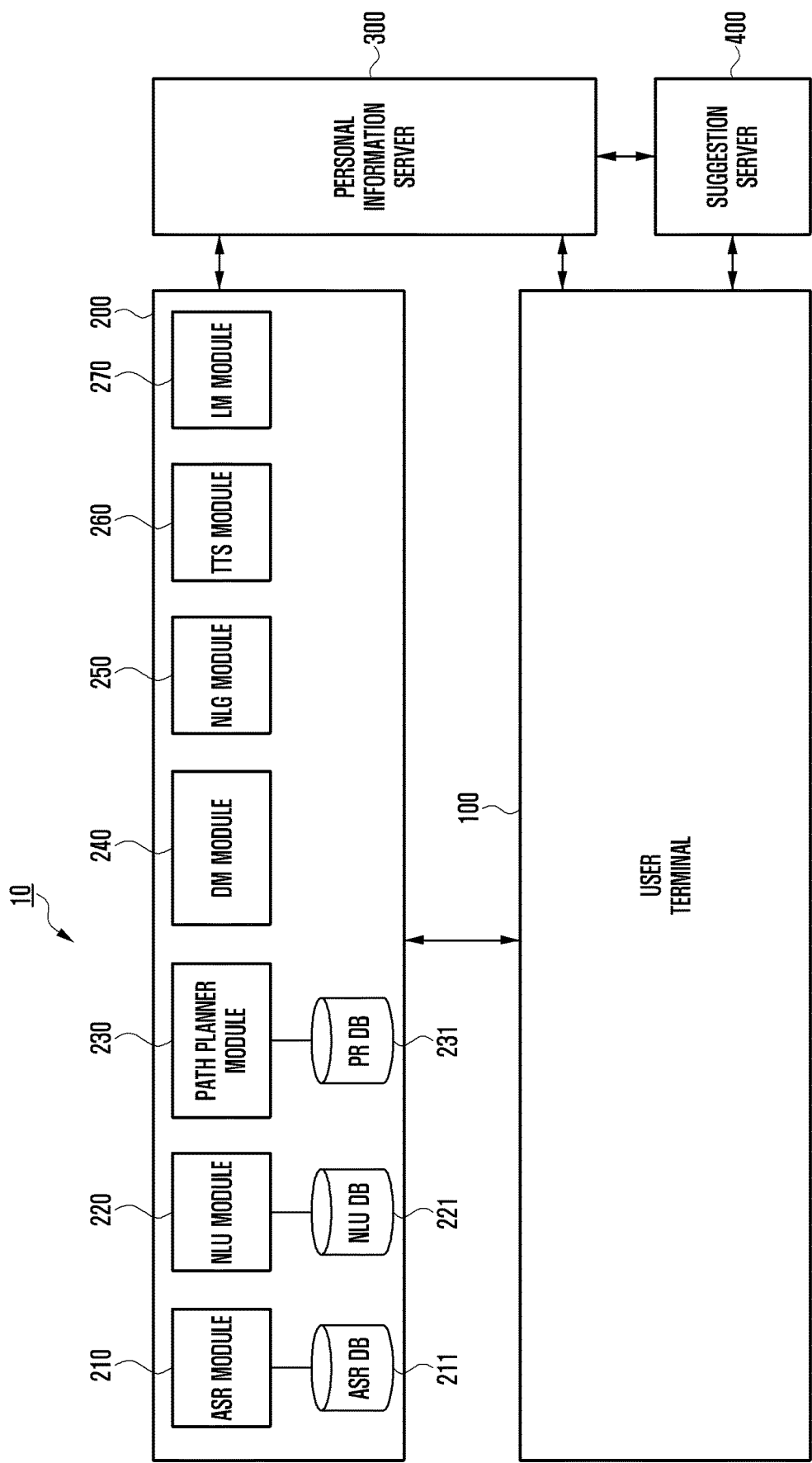
FIG. 4 is a block diagram illustrating the intelligence server of the integrated intelligence system according to an embodiment of the present disclosure.

FIG. 4 is a block diagram illustrating the intelligence server of the integrated intelligence system according to an embodiment of the present disclosure.

Referring to FIG. 4, an integrated intelligence system (e.g., the integrated intelligence system 10 of FIG. 1) may include an intelligence server (e.g., the intelligence server 200 of FIG. 1). The intelligence server 200 may include an automatic speech recognition (ASR) module (e.g., including various processing circuitry and/or program elements) 210, a natural language understanding (NLU) module (e.g., including various processing circuitry and/or program elements) 220, a path planner module (e.g., including various processing circuitry and/or program elements) 230, a dialogue manager (DM) module (e.g., including various processing circuitry and/or program elements) 240, a natural language generator (NLG) module (e.g., including various processing circuitry and/or program elements) 250, a text-to-speech (TTS) module (e.g., including various processing circuitry and/or program elements) 260 or a landing manager (LM) module (e.g., including various processing circuitry and/or program elements) 270.

The NLU module 220 or path planner module 230 of the intelligence server 200 may include various processing circuitry and/or program elements and generate a path rule.

In accordance with an embodiment, the ASR module 210 may include various processing circuitry and/or program elements and convert a user input, received from the user terminal 100, into text data.

In accordance with an embodiment, the automatic speech recognition module 210 may include various processing circuitry and/or program elements and convert a user input, received from the user terminal 100, into text data. For example, the automatic speech recognition module 210 may include a speech recognition module. The speech recognition module may include an acoustic model and a language model. For example, the acoustic model may include information on vocalization. The language model may include unit phoneme information and information on a combination of unit phoneme information. The speech recognition module may convert a user speech into text data using information related to vocalization and information on unit phoneme information. Information on the acoustic model and the language model may be stored in an automatic speech recognition database (ASR DB) 211, for example.

In accordance with an embodiment, the NLU module 220 may include various processing circuitry and/or program elements and identify user intent by performing syntactic analysis or semantic analysis. In the syntactic analysis, a user input may be divided into syntactic units (e.g., a word, a phrase or a morpheme), and what the divided unit has which syntactic element may be identified. The semantic analysis may be performed using semantic matching, rule matching, formula matching and so on. Accordingly, the NLU module 220 may obtain a domain, intent or a parameter (or slot) necessary to express the intent from the user input.

In accordance with an embodiment, the NLU module 220 may identify a user's intent and a parameter using a matching rule divided into a domain, intent and a parameter (or slot) necessary to identify the intent. For example, one domain (e.g., alarm) may include a plurality of intents (e.g., alarm setting or alarm release), and one intent may include a plurality of parameters (e.g., time, a repetition number or a alarm sound). A plurality of rules may include one or more essential element parameters, for example. The matching rule may be stored in a natural language understanding database (NLU DB) 221.

In accordance with an embodiment, the NLU module 220 may identify the meaning of a word obtained from a user input using linguistic characteristics (e.g., a syntactic element), such as a morpheme and a phrase, and may identify the user's intent by matching the identified meaning of the word with a domain and intent. For example, the NLU module 220 may identify the user's intent by calculating how many words obtained from the user input are included in each domain and intent. In accordance with an embodiment, the NLU module 220 may identify the parameter of the user input using a word, that is, a basis for identifying the intent. In accordance with an embodiment, the NLU module 220 may identify the user's intent using the NLU DB 221 in which linguistic characteristics for identifying the intent of the user input have been stored. In accordance with another embodiment, the NLU module 220 may identify the user's intent using a personal language model (PLM). For example, the NLU module 220 may identify the user's intent using personal information (e.g., a contact information list or a music list). The personal language model may be stored in the NLU DB 221, for example. In accordance with an embodiment, in addition to the NLU module 220, the automatic speech recognition module 210 may recognize a user's voice with reference to the personal language model stored in the NLU DB 221.

In accordance with an embodiment, the NLU module 220 may generate a path rule based on the intent of a user input and a parameter. For example, the NLU module 220 may select an app to be executed based on the intent of a user input, and may identify an operation to be executed in the selected app. The NLU module 220 may identify a parameter corresponding to the identified operation and generate a path rule. In accordance with an embodiment, the path rule generated by the NLU module 220 may include information on an app to be executed, an operation to be executed in the app, and a parameter necessary to execute the operation.

In accordance with an embodiment, the NLU module 220 may generate one path rule or a plurality of path rules based on the intent of a user input and a parameter. For example, the NLU module 220 may receive a path rule set corresponding to the user terminal 100 from the path planner module 230, and may identify a path rule by mapping the intent of a user input and a parameter to the received path rule set.

In accordance with another embodiment, the NLU module 220 may identify an app to be executed, an operation to be executed in the app, and a parameter necessary to execute the operation based on the intent of a user input and a parameter, and may generate one path rule or a plurality of path rules. For example, the NLU module 220 may generate a path rule by arranging the app to be executed and the operation to be executed in the app in an ontology or graph model form based on the intent of the user input using information of the user terminal 100. The generated path rule may be stored in a path rule database (PR DB) 231 through the path planner module 230, for example. The generated path rule may be added to a path rule set of the database 231.

In accordance with an embodiment, the NLU module 220 may select at least one of a plurality of generated path rules. For example, the NLU module 220 may select an optimum one of the plurality of path rules. For another example, the NLU module 220 may select a plurality of path rules if only some operations are given based on a user speech. The NLU module 220 may identify one of the plurality of path rules based on a user's additional input.

In accordance with an embodiment, the NLU module 220 may transmit a path rule to the user terminal 100 in response to a request for a user input. For example, the NLU module 220 may transmit one path rule corresponding to a user input to the user terminal 100. For another example, the NLU module 220 may transmit a plurality of path rules corresponding to a user input to the user terminal 100. The plurality of path rules may be generated by the NLU module 220 if only some operations are given based on a user speech, for example.

In accordance with an embodiment, the path planner module 230 may include various processing circuitry and/or program elements and select at least one of a plurality of path rules.

In accordance with an embodiment, the path planner module 230 may transmit a path rule set, including a plurality of path rules, to the NLU module 220. The plurality of path rules of the path rule set may be stored in a table form in the PR DB 231 connected to the path planner module 230. For example, the path planner module 230 may transmit a path rule set, corresponding to information (e.g., OS information or app information) of the user terminal 100 received from the intelligence agent 151, to the NLU module 220. The table stored in the PR DB 231 may be stored for each domain or each version of a domain, for example.

In accordance with an embodiment, the path planner module 230 may select one path rule or a plurality of path rules in a path rule set and transmit the selected path rule or path rules to the NLU module 220. For example, the path planner module 230 may select one path rule or a plurality of path rules by matching a user's intent and a parameter to a path rule set corresponding to the user terminal 100, and may transmit the path rule or path rules to the NLU module 220.

In accordance with an embodiment, the path planner module 230 may generate one path rule or a plurality of path rules using a user's intent and a parameter. For example, the path planner module 230 may identify an app to be executed and an operation to be executed in the app a user's intent and a parameter, and may generate one path rule or a plurality of path rules. In accordance with an embodiment, the path planner module 230 may store the generated path rule in the PR DB 231.

In accordance with an embodiment, the path planner module 230 may store a path rule, generated in the NLU module 220, in the PR DB 231. The generated path rule may be added to a path rule set stored in the PR DB 231.

In accordance with an embodiment, a table stored in the PR DB 231 may include a plurality of path rules or a plurality of path rule sets. The plurality of path rules or the plurality of path rule sets may incorporate the kind, version, type or characteristics of a device that performs each path rule.

In accordance with an embodiment, the DM module 240 may include various processing circuitry and/or program elements and determine whether a user's intent identified by the NLU module 220 is clear. For example, the DM module 240 may determine whether a user's intent is clear based on whether information of a parameter is sufficient. The DM module 240 may determine whether a parameter identified by the NLU module 220 is sufficient to perform a task. In accordance with an embodiment, if a user's intent is not clear, the DM module 240 may perform feedback that requests necessary information from the user. For example, the DM module 240 may perform feedback that requests information on a parameter for determining a user's intent.

In accordance with an embodiment, the DM module 240 may include a content provider module. If an operation can be performed based on an intent and parameter identified by the NLU module 220, the content provider module may generate the results of the execution of a task corresponding to a user input. In accordance with an embodiment, the DM module 240 may transmit results generated by the content provider module to the user terminal 100 as a response to a user input.

In accordance with an embodiment, the NLG module 250 may include various processing circuitry and/or program elements and change selected information in a text form. The information changed in a text form may be a form of a natural language speech. The selected information may be information on an additional input, information that provides guidance of the completion of an operation corresponding to a user input, or information (e.g., feedback information on a user input) that provides guidance of a user's additional input, for example. The information changed in a text form may be transmitted to the user terminal 100 and displayed on the display 120 or may be transmitted to the text-to-speech module 260 and changed in a speech form.

In accordance with an embodiment, the text-to-speech module 260 may include various processing circuitry and/or program elements and change information of a text form into information of a speech form. The text-to-speech module 260 may receive information of a text form from the NLG module 250, may change the information of a text form into information of a speech form, and may transmit the information of a speech form to the user terminal 100. The user terminal 100 may output the information of a speech form to the speaker 130.

In accordance with an embodiment, the NLU module 220, the path planner module 230 and the DM module 240 may be implemented as a single module. For example, the NLU module 220, the path planner module 230 and the DM module 240 may be implemented as a single module. The single module may identify a user's intent and a parameter and generate a response (e.g., a path rule) corresponding to the identified user's intent and parameter. Accordingly, the generated response may be transmitted to the user terminal 100.

In accordance with various embodiments of the present disclosure, when partial landing occurs during the operation (e.g., operations 1 to 3 141*b* of FIG. 2 or operations 1 to 3 143*b* of FIG. 2) of a first application (e.g., the first app 141 of FIG. 2) or a second application (e.g., the second app 143 of FIG. 2) in a user terminal (e.g., the user terminal 100 of FIG. 1), a subsequent operation may be performed only when a deficient parameter is received. A device in which partial landing has occurred (e.g., the user terminal 100) and a device that receives an additional parameter (e.g., the first external device 600) may be the same, but may be different. For example, a device that receives a voice and a device that receives an additional parameter may be different. The user terminal 100 may determine whether a device that receives a voice and a device that receives an additional parameter will be differently configured based on the characteristics of a parameter obtained from an input voice, the characteristics of an external device or the location of a user.

When partial landing occurs, the LM module 270 may perform an operation of identifying an external device that belongs to external devices (e.g., the first external device 600 and user terminal 100 of FIG. 1) and that will perform an operation of receiving a user input for a deficient parameter.

In accordance with various embodiments of the present disclosure, the LM module 270 may include various processing circuitry and/or program elements and generate a UE for receiving a user input for an additional parameter and transmit the generated UI to the identified first external device 600.

In accordance with various embodiments of the present disclosure, the LM module 270 may identify the characteristics of an additional parameter using information on partial landing received from the user terminal 100, and may identify the characteristics of first external devices 600. The characteristics of an external device may refer, for example, to various types of information of the external device. For example, the characteristics of an external device may refer, for example, to resolution of the display of the external device, information on the capability of the external device or the type or information of input/output devices included in the external device.

In accordance with various embodiments of the present disclosure, the LM module 270 may identify a first external device 600 that belongs to external devices 600 and that will receive an additional parameter based on at least any one of the characteristics of an additional parameter and the characteristics of the external devices 600. For example, the characteristics of a parameter may include the type of data (e.g., an image, a photo or audio) previously input by a user, the type of application (e.g., an SMS application) that needs to be selected by a user, the type of data (e.g., an image, a photo or audio) that needs to be selected by a user or the size of data that needs to be selected by a user.

In accordance with various embodiments of the present disclosure, if a visual element is included in a user interface generated for the input of an additional parameter or the type of parameter included in the characteristics of an additional parameter is related to a visual element, the LM module 270 may identify a first external device 600 that belongs to external devices 600 and that is equipped with a display as a device that will receive a user input for an additional parameter, and may transmit the generated user interface (e.g., a display capable of receiving selection) to the identified first external device 600.

In accordance with various embodiments of the present disclosure, the LM module 270 may differently generate a user interface by taking into consideration display information (e.g., resolution or whether a video standard (e.g., a codec, such as H. 264 or H. 265) is supported) of the first external device 600. For example, if the first external device 600 is TV that supports up to resolution of ultra high definition (HUD), the LM module 270 may generate a user interface including a lot of information. For another example, if the size of the display of the first external device 600 is a display of a given size or less that is unsuitable for displaying a lot of information, the LM module 270 may generate a simple user interface including a small amount of information.

In accordance with various embodiments of the present disclosure, if an acoustic element is included in a user interface for receiving an additional parameter, the LM module 270 may identify a first external device 600 that belongs to external devices 600 and that includes a speaker as a device that will receive a user input for an additional parameter, and may transmit the generated user interface (e.g., a sound that induces a user input to be performed in voice or text or an image that induces a user input to be performed) to the identified first external device 600. A user interface implemented in voice may be generated from the NLG module 250.

In accordance with various embodiments of the present disclosure, the LM module 270 may receive a user input including an additional parameter from the first external device 600, and may obtain the additional parameter based on the user input. For example, if a user input is a voice, the LM module 270 may obtain the user input as text data using the ASR module 210, may receive a user's intent and parameter information using the NLU module 220, may generate a new path rule, and may transmit the new path rule to the user terminal 100. The user terminal 100 may execute a task based on the new path rule, thereby being capable of deviating from partial landing.

In accordance with various embodiments of the present disclosure, the LM module 270 may transmit an obtained parameter to the user terminal 100 without newly generating a path rule. The user terminal 100 may deviate from partial landing while executing a task using an already received path rule and a newly obtained parameter.

In accordance with various embodiments of the present disclosure, if the LM module 270 performs an operation of identifying an external device that will perform an operation of receiving a user input for a deficient parameter when partial landing occurs in the cloud server 500, it may not perform the operation of identifying an external device that will perform an operation of receiving a user input for a deficient parameter, but may transmit a message that requests partial landing information and the selection of an external device for a user's additional input to the cloud server 500.

Figure 5:
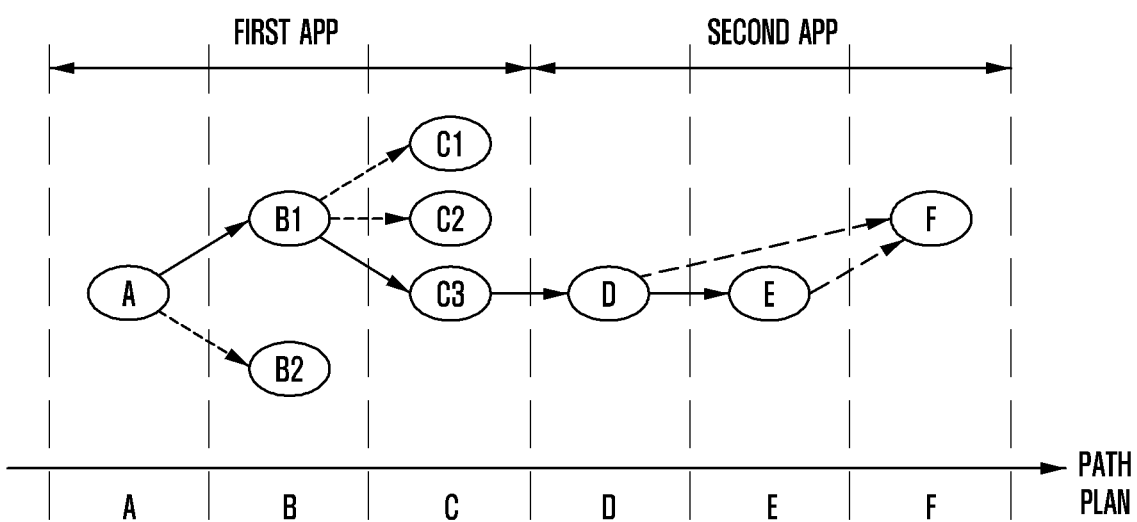
FIG. 5 is a diagram illustrating a method for a path natural language understanding (NLU) module to generate a path rule according to an embodiment of the present disclosure.

FIG. 5 is a diagram illustrating a method for an NLU module to generate a path rule according to an embodiment of the present disclosure.

Referring to FIG. 5, an NLU module (e.g., the NLU module 220 of FIG. 4) according to an embodiment may divide the function of an app into unit operations A to F and store them in the PR DB 231. For example, the NLU module 220 may store a path rule set, including a plurality of path rules A-B1-C1, A-B1-C2, A-B1-C3-D-F, and A-B1-C3-D-E-F, A-B2 divided into unit operations, in the PR DB 231.

In accordance with an embodiment, the PR DB 231 of the path planner module 230 may store a path rule set for performing the function of an app. The path rule set may include a plurality of path rules including a plurality of operations. In the plurality of path rules, operations executed based on parameters input to a plurality of operations may be sequentially arranged. In accordance with an embodiment, the plurality of path rules may be configured in an ontology or graph model form and stored in the PR DB 231.

In accordance with an embodiment, the NLU module 220 may select an optimum path rule A-B1-C3-D-F from the plurality of path rules A-B1-C1, A-B1-C2, A-B1-C3-D-F, and A-B1-C3-D-E-F corresponding to the intent of a user input and a parameter.

In accordance with an embodiment, if a path rule perfectly matched with a user input is not present, the NLU module 220 may transmit a plurality of rules to the user terminal 100. For example, the NLU module 220 may select a path rule (e.g., A-B1) partially corresponding to the user input. The NLU module 220 may select one or more path rules (e.g., A-B1-C1, A-B1-C2, A-B1-C3-D-F, and A-B1-C3-D-E-F) including a path rule (e.g., A-B1) partially corresponding to a user input, and may transmit the one or more path rules to the user terminal 100.

In accordance with an embodiment, the NLU module 220 may select one of a plurality of path rules based on an additional input of the user terminal 100, and may transmit the selected one path rule to the user terminal 100. For example, the NLU module 220 may select one path rule (e.g., A-B1-C3-D-F) of a plurality of path rules (e.g., A-B1-C1, A-B1-C2, A-B1-C3-D-F, A-B1-C3-D-E-F) based on a user input (e.g., an input to select C3) additionally input to the user terminal 100, and may transmit the selected path rule to the user terminal 100.

In accordance with another embodiment, the NLU module 220 may identify a user's intent and parameter corresponding to a user input (e.g., an input to select C3) additionally input to the user terminal 100 through the NLU module 220, and may transmit the identified user's intent or parameter to the user terminal 100. The user terminal 100 may select one path rule (e.g., A-B1-C3-D-F) of a plurality of path rules (e.g., A-B1-C1, A-B1-C2, A-B1-C3-D-F, and A-B1-C3-D-E-F) based on the received intent or the parameter.

Accordingly, the user terminal 100 may complete the operations of the apps 141 and 143 according to the selected one path rule.

In accordance with an embodiment, when a user input including insufficient information is input to the intelligence server 200, the NLU module 220 may generate a path rule partially corresponding to the received user input. For example, the NLU module 220 may transmit the partially corresponding path rule to the intelligence agent 151 (①). The intelligence agent 151 may transmit the partially corresponding path rule to the execution manager module 153 (②). The execution manager module 153 may execute the first app 141 according to the path rule. The execution manager module 153 may transmit information on a deficient parameter to the intelligence agent 151 (③) while executing the first app 141. The intelligence agent 151 may request an additional input from a user using the information on the deficient parameter. The intelligence agent 151 may process the additional input from the user by transmitting the additional input to the intelligence server 200 when the additional input is received (④). The NLU module 220 may generate an added path rule based on the intent of the additionally input user input and the parameter information, and may transmit the added path rule to the intelligence agent 151 (⑤). The intelligence agent 151 may execute the second app 143 by transmitting the path rule to the execution manager module 153 (⑥).

In accordance with an embodiment, when a user input having some information omitted is input to the intelligence server 200, the NLU module 220 may transmit a user information request to the personal information server 300. The personal information server 300 may transmit information of a user who has input a user input stored in the persona database to the NLU module 220. The NLU module 220 may select a path rule corresponding to a user input having some operation omitted using the user information. Accordingly, although a user input having some information omitted is input to the intelligence server 200, the NLU module 220 may receive an additional input by requesting the omitted information or may identify a path rule corresponding to the user input using user information.

Figure 6:
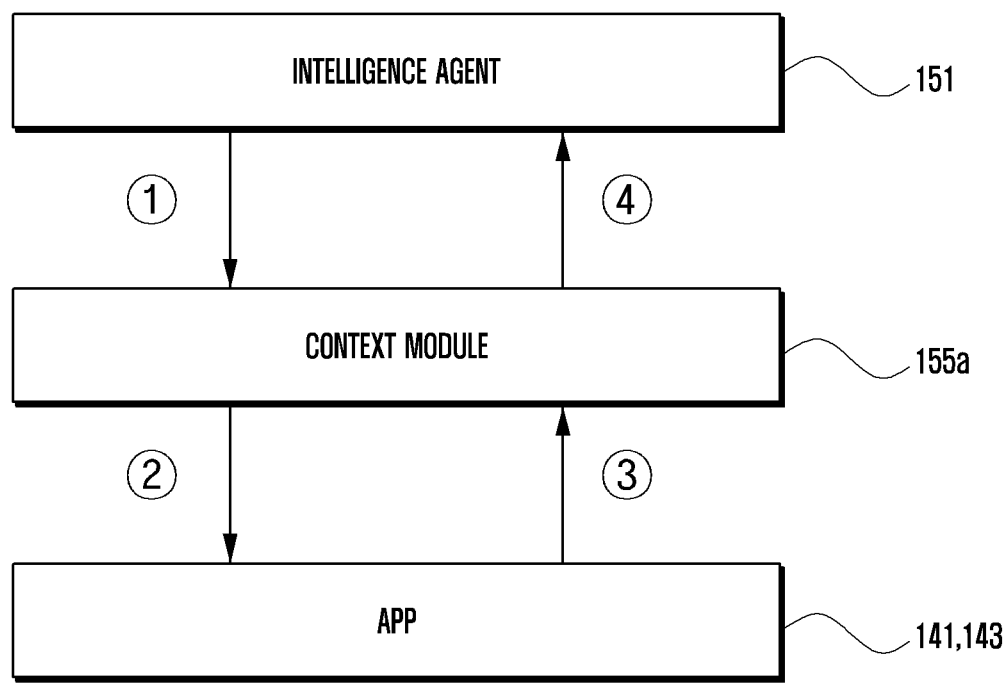
FIG. 6 is a diagram illustrating that the context module of a processor according to an embodiment of the present disclosure collects a current state.

FIG. 6 is a diagram illustrating that the context module of the processor according to an embodiment of the present disclosure collects a current state.

Referring to FIG. 6, when a context request is received from the intelligence agent (e.g., including processing circuitry and/or program elements) 151 (① of FIG. 6), the context module (e.g., including processing circuitry and/or program elements) 155a may request context information indicative of the current states of the apps 141 and 143 from the apps 141 and 143 (② of FIG. 6). In accordance with an embodiment, the context module 155a may receive the context information from the apps 141 and 143 (③ of FIG. 6) and transmit it to the intelligence agent 151 (④ of FIG. 6).

In accordance with an embodiment, the context module 155a may receive a plurality of pieces of context information through the apps 141 and 143. For example, the context information may be information on the most recently executed apps 141 and 143. For another example, the context information may be information on the current states of the apps 141 and 143 (e.g., information on a photo when the corresponding photo is watched in a gallery).

In accordance with an embodiment, the context module 155a may receive context information indicative of the current state of the user terminal 100 from a device platform in addition to the apps 141 and 143. The context information may include common context information, user context information or device context information.

The common context information may include common information of the user terminal 100. The common context information may be checked through an algorithm by receiving data through the sensor hub of a device platform. For example, the common context information may include information on a current time-space. The information on the current time-space may include the current time or information on the current location of the user terminal 100, for example. The current time may be checked through time in the user terminal 100, and the information on the current location may be checked through a global positioning system (GPS). For another example, the common context information may include information on a physical motion. The information on the physical motion may include information on walking, running, or driving, for example. The information on the physical motion may be checked through a motion sensor. Driving may be checked based on the information on the driving through the motion sensor, and boarding and parking may also be checked based on the information on the driving by sensing a Bluetooth connection within a vehicle. For another example, the common context information may include user activity information. The user activity information may include information on commute, shopping or travel, for example. The user activity information may be checked based on information on the place registered with a database by a user or an app.

The user context information may include information on a user. For example, the user context information may include information on a user's emotional state. The information on the emotional state may include information on a user's happiness, sadness or angry, for example. For another example, the user context information may include information on a user's current state. The information on the current state may include information on an interest or intent (e.g., shopping), for example.

The device context information may include information on the state of the user terminal 100. For example, the device context information may include information on a path rule executed by the execution manager module 153. For another example, the device context information may include information on a battery. The information on the battery may be checked through the charging and discharging state of the battery, for example. For yet another example, the device context information may include information on a connected device and a network. The information on the connected device may be identified through a communication interface to which the device has been connected, for example.

Figure 7:
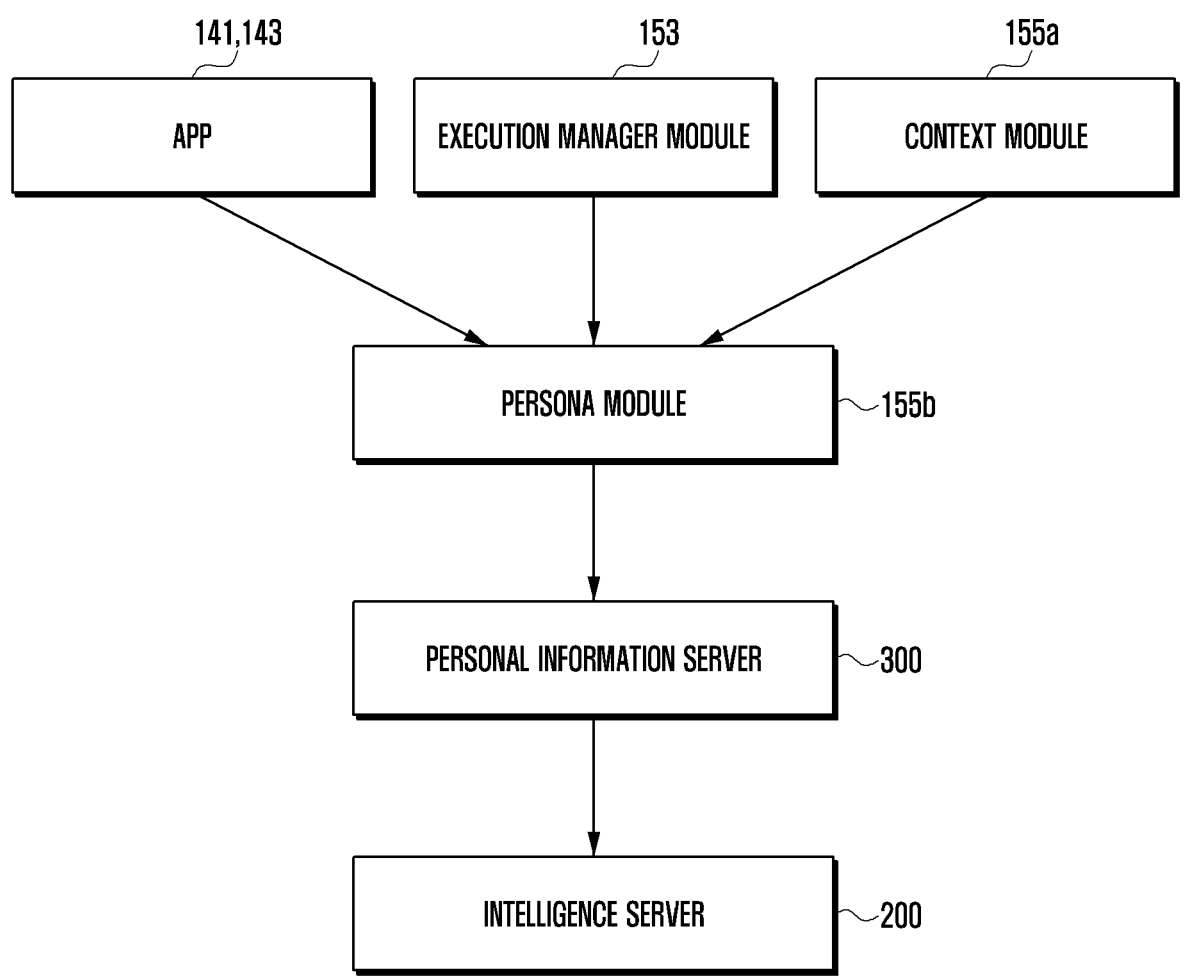
FIG. 7 is a diagram illustrating that a persona module according to an embodiment of the present disclosure manages a user's information.

FIG. 7 is a diagram illustrating that a persona module according to an embodiment of the present disclosure manages a user's information.

Referring to FIG. 7, the persona module (e.g., including processing circuitry and/or program elements) 155b may receive information of the user terminal 100 from the apps 141 and 143, the execution manager module (e.g., including processing circuitry and/or program elements) 153 and/or the context module (e.g., including processing circuitry and/or program elements) 155a. The apps 141 and 143 and the execution manager module 153 may store information on the results of the execution of the operations 141b and 143b of an app in the operation log database. The context module 155a may store information on the current state of the user terminal 100 in the context database. The persona module 155b may receive the stored information from the operation log database or the context database. Data stored in the operation log database and the context database may be analyzed by an analysis engine, for example, and transmitted to the persona module 155b.

In accordance with an embodiment, the persona module 155b may transmit information, received from the apps 141 and 143, the execution manager module 153 or the context module 155a, to the suggestion module 155c. For example, the persona module 155b may transmit data, stored in the operation log database or the context database, to the suggestion module 155c.

In accordance with an embodiment, the persona module 155b may transmit information, received from the apps 141 and 143, the execution manager module 153 or the context module 155a, to the personal information server 300. For example, the persona module 155b may periodically transmit data, accumulated and stored in the operation log database or the context database, to the personal information server 300.

In accordance with an embodiment, the persona module 155b may transmit data, stored in the operation log database or the context database, to the suggestion module 155c. User information generated by the persona module 155b may be stored in the persona database. The persona module 155b may periodically transmit user information, stored in the persona database, to the personal information server 300. In accordance with an embodiment, information transmitted from the persona module 155*b* to the personal information server 300 may be stored in the persona database. The personal information server 300 infers user information necessary to generate a path rule of the intelligence server 200 using information stored in the persona database.

In accordance with an embodiment, user information inferred using information transmitted by the persona module 155*b* may include profile information or preference information. The profile information or the preference information may be inferred through a user's account and accumulated information.

The profile information may include a user's personal information. For example, the profile information may include a user's demographics information. The demographics information may include a user's gender or age, for example. For another example, the profile information may include life event information. The life event information may be inferred by comparing log information, for example, with a life event model, and may be reinforced by analyzing a behavior pattern. For yet another example, the profile information may include interest information. The interest information may include an interest shopping article or an interest field (e.g., sports or politics), for example. For yet another example, the profile information may include activity area information. The activity area information may include information on a home or a work place, for example. The information on the activity area may include information on an area to which priority has been assigned based on an accumulated stay time and visit number in addition to information on the location of a place. For yet another example, the profile information may include activity time information. The activity time information may include information on a wake-up time, a commute time or a sleep time, for example. The information on the commute time may be inferred using activity area information (e.g., information on a home or a work place). The information on the sleep time may be inferred using the unused time of the user terminal 100.

The preference information may include a user's preference information. For example, the preference information may include information on an app preference. The app preference may be inferred through the use history (e.g., a use history for each hour or each place) of an app, for example. The app preference may be used to identify an app to be executed based on a user's current state (e.g., time or place). For another example, the preference information may include information on contact information preference. The contact information preference may be inferred by analyzing contact information (e.g., frequency that connection is made for each hour or each place) information of contact information, for example. The contact information preference may be used to identify contact information based on a user's current state (e.g., connection with a redundant name). For yet another example, the preference information may include setting information. The setting information may be inferred by analyzing setting frequency (e.g., frequency set as a setting value for each hour and each place) information of a given setting value, for example. The setting information may be used to set a given setting value based on a user's current state (e.g., time, a place or a situation). For yet another example, the preference information may include place preference. The place preference may be inferred through the visit history (e.g., a visit history for each hour) of a given place, for example. The place preference may be used to identify the place that is visited based on a user's current state (e.g., hour). For yet another example, the preference information may include command preference. The command preference may be inferred through command use frequency (e.g., use frequency for each hour or each place), for example. The command preference may be used to identify a command pattern to be used based on a user's current state (e.g., time or place). In particular, the command preference may include information on a menu most selected by a user in the current state of an app that is being executed by analyzing log information.

Figure 8:
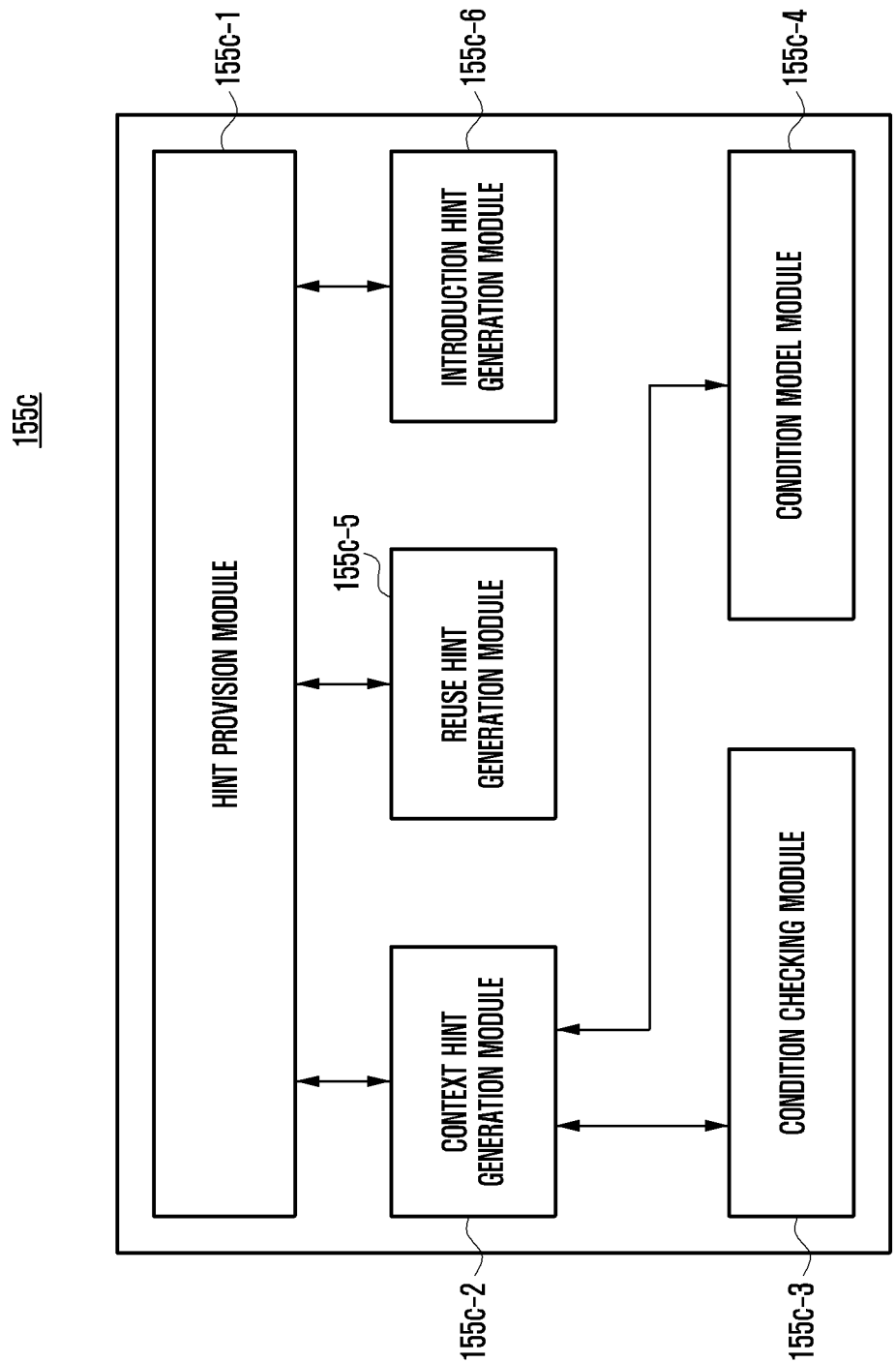
FIG. 8 is a block diagram illustrating the suggestion module according to an embodiment of the present disclosure.

FIG. 8 is a block diagram illustrating the suggestion module according to an embodiment of the present disclosure.

Referring to FIG. 8, the suggestion module (e.g., including processing circuitry and/or program elements) 155*c* may include a hint provision module (e.g., including processing circuitry and/or program elements) 155*c*-1, a context hint generation module (e.g., including processing circuitry and/or program elements) 155*c*-2, a condition checking module (e.g., including processing circuitry and/or program elements) 155*c*-3, a condition model module (e.g., including processing circuitry and/or program elements) 155*c*-4, a reuse hint generation module (e.g., including processing circuitry and/or program elements) 155*c*-5 and/or an introduction hint generation module (e.g., including processing circuitry and/or program elements) 155*c*-6.

In accordance with an embodiment, the hint provision module 155*c*-1 may include various processing circuitry and/or program elements and provide a hint to a user. For example, the hint provision module 155*c*-1 may receive a generated hint from the context hint generation module 155*c*-2, the reuse hint generation module 155*c*-5 or the introduction hint generation module 155*c*-6, and may provide the hint to a user.

In accordance with an embodiment, the context hint generation module 155*c*-2 may include various processing circuitry and/or program elements and generate a recommendable hint based on the current state through the condition checking module 155*c*-3 or the condition model module 155*c*-4. The condition checking module 155*c*-3 may include various processing circuitry and/or program elements and receive information corresponding to the current state through the intelligence service module 155. The condition model module 155*c*-4 may include various processing circuitry and/or program elements and configure a condition model using the received information. For example, the condition model module 155*c*-4 may check the time, location or situation when a hint is provided to a user or an app that is being used, and may provide a user with a hint having a good possibility that the hint will be used in a corresponding condition in order of higher priority.

In accordance with an embodiment, the reuse hint generation module 155*c*-5 may include various processing circuitry and/or program elements and generate a recommendable hint by taking into consideration use frequency based on the current state. For example, the reuse hint generation module 155*c*-5 may include various processing circuitry and/or program elements and generate a hint by taking into consideration a user's use pattern.

In accordance with an embodiment, the introduction hint generation module 155*c*-6 may include various processing circuitry and/or program elements and generate a hint that a new function or a function widely used by other users is introduced into a user. For example, the hint that introduces the new function may include the introduction (e.g., an operating method) of the intelligence agent 151.

In accordance with another embodiment, the context hint generation module 155c-2, condition checking module 155c-3, condition model module 155c-4, reuse hint generation module 155c-5 or introduction hint generation module 155c-6 of the suggestion module 155c may be included in the personal information server 300. For example, the hint provision module 155c-1 of the suggestion module 155c may receive a hint from the context hint generation module 155c-2, reuse hint generation module 155c-5 or introduction hint generation module 155c-6 of the personal information server 300, and may provide the received hint to a user.

In accordance with an embodiment, the user terminal 100 may provide a hint according to a series of the following processes. For example, when a hint provision request is received from the intelligence agent 151 (①), the hint provision module 155c-1 may transmit a hint generation request to the context hint generation module 155c-2 (②). When the hint generation request is received, the context hint generation module 155c-2 may receive (④) information corresponding to the current state from the context module 155a and the persona module 155b using the condition checking module 155c-3 (③). The condition checking module 155c-3 may transmit the received information to the condition model module 155c-4 (⑤). The condition model module 155c-4 may assign priority to a hint that belongs to hints provided to a user using the information and has the best possibility that the hint will be used in a condition. The context hint generation module 155c-2 may check the condition (⑥) and generate a hint corresponding to the current state. The context hint generation module 155c-2 may transmit the generated hint to the hint provision module 155c-1 (⑦). The hint provision module 155c-1 may arrange the hints according to a selected rule and transmit the hint to the intelligence agent 151 (⑧).

In accordance with an embodiment, the hint provision module 155c-1 may generate a plurality of context hints and assign priority to the plurality of context hints according to a selected rule. In accordance with an embodiment, the hint provision module 155c-1 may first provide a user with a context hint that belongs to the plurality of context hints and that has high priority.

In accordance with an embodiment, the user terminal 100 may suggest a hint based on use frequency. For example, when a hint provision request is received from the intelligence agent 151 (①), the hint provision module 155c-1 may transmit a hint generation request to the reuse hint generation module 155c-5 (②). When the hint generation request is received, the reuse hint generation module 155c-5 may receive user information from the persona module 155b (③). For example, the reuse hint generation module 155c-5 may receive a path rule included in user's preference information of the persona module 155b, a parameter included in a path rule, execution frequency of an app or time-space information of a used app. The reuse hint generation module 155c-5 may generate a hint corresponding to the received user information. The reuse hint generation module 155c-5 may transmit the generated hint to the hint provision module 155c-1 (④). The hint provision module 155c-1 may arrange the hint and transmit the hint to the intelligence agent 151 (⑤).

In accordance with an embodiment, the user terminal 100 may suggest a new function. For example, when a hint provision request is received from the intelligence agent 151 (①), the hint provision module 155c-1 may transmit a hint generation request to the introduction hint generation module 155c-6 (②). The introduction hint generation module 155c-6 may receive (④) information on a function to be introduced from the suggestion server 400 by transmitting an introduction hint provision request to the suggestion server 400 (③). For example, the suggestion server 400 may store information on a function to be introduced. A hint list of functions to be introduced may be updated by a service operator. The introduction hint generation module 155c-6 may transmit the generated hint to the hint provision module 155c-1 (⑤). The hint provision module 155c-1 may arrange the hint and transmit the hint to the intelligence agent 151 (⑥).

Accordingly, the suggestion module 155c may provide a user with a hint generated by the context hint generation module 155c-2, the reuse hint generation module 155c-5 or the introduction hint generation module 155c-6. For example, the suggestion module 155c may display the generated hint in an app that drives the intelligence agent 151, and may receive an input to select the hint from the user through the app.

Figure 9:
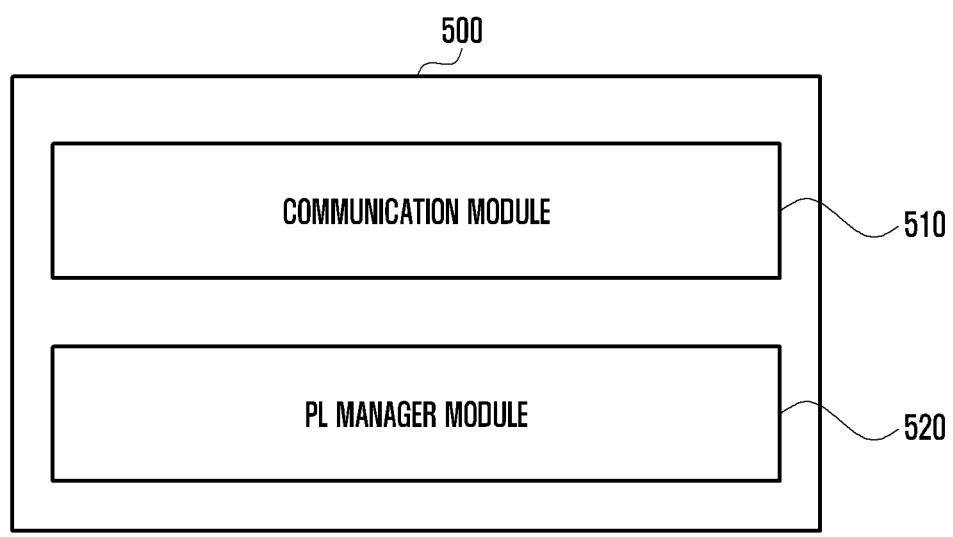
FIG. 9 is a block diagram illustrating a cloud server according to various embodiments of the present disclosure.

FIG. 9 is a block diagram illustrating a cloud server (e.g., the cloud server 500 of FIG. 1) according to various embodiments of the present disclosure.

Referring to FIG. 9, the cloud server 500 may include a communication module (e.g., including communication circuitry) 510 and a partial landing (PL) manager module (e.g., including processing circuitry and/or program elements) 520.

The communication module 510 may include various communication circuitry and transmit/receive data to/from an external device (e.g., the intelligence server 200, the first external device 600 or the user terminal 100 of FIG. 1) and the first external device 600. In accordance with various embodiments of the present disclosure, the communication module 510 may receive information on partial landing transmitted by the intelligence server 200 or the data of a user interface for the input of an additional parameter.

The PL manager module 520 may include various processing circuitry and/or program elements and differently configure an external device that has performed an operation of receiving a voice and an external device that will perform an operation of receiving an additional parameter by taking into consideration at least one of the characteristics of a parameter obtained from a voice input spoken by a user, the characteristics of external devices and a user's location. In this case, the device that receives a voice and the device that receives an additional parameter may be different. The additional parameter may refer, for example, to a parameter for deviating from partial landing when the partial landing occurs in a user terminal (e.g., the user terminal 100 of FIG. 1).

In accordance with various embodiments of the present disclosure, the PL manager module 520 may perform various operations while operating in conjunction with the intelligence server 200. For example, the intelligence server 200 may transmit second information based on second data, indicating that an additional user input is necessary, to the cloud server 500. The PL manager module 520 may identify an external device for receiving an additional parameter using the second information.

In accordance with various embodiments of the present disclosure, the PL manager module 520 may transmit information on partial landing (e.g., an additional parameter, such as contact information or application information to be selected by a user), received from the communication module 510, to the first external device 600. In accordance with various embodiments of the present disclosure, the PL manager module 520 may generate a user interface for a user input based on the characteristics of a parameter and the characteristics (e.g., whether a display is included, information on resolution of a display, whether a speaker is included or information on the capability of an external device) of an external device that will perform a user input for selecting an additional parameter.

In accordance with various embodiments of the present disclosure, the cloud server 500 and an intelligence server (e.g., the intelligence server 200 of FIG. 1) may identify an external device that will receive a user input for an additional parameter while operating in conjunction with each other, and may generate a user interface for inputting an additional parameter. For example, the LM module (e.g., the LM module 270 of FIG. 4) of the intelligence server 200 may perform the same function as the PL manager module 510. When the cloud server 500 identifies an external device that will receives a user input, the LM module 270 may not perform an operation of identifying an external device.

In accordance with various embodiments of the present disclosure, the first external device 600 and the cloud server 500 may transmit/receive information on the configuration of a UI screen using the notification service of an open interconnect consortium (OIC) standard.

In accordance with various embodiments of the present disclosure, information on an external device may be previously stored in the memory (not shown) of the cloud server 500. Information on an external device may refer, for example, to various types of information on an external device whose user has been authenticated. For example, information on an external device may include various types of information, such as the MAC address, IP address or unique identifier number of a first external device 600, whether a display is included, whether a speaker is included, and information of included parts.

In accordance with another embodiment of the present disclosure, the function of the cloud server 500 may be performed by the intelligence server 200 instead. If the function of the cloud server 500 is performed by the intelligence server 200, data transmission/reception between the intelligence server 200 and the first external device 600 may be directly performed without the intervention of the cloud server 500.

Figure 10:
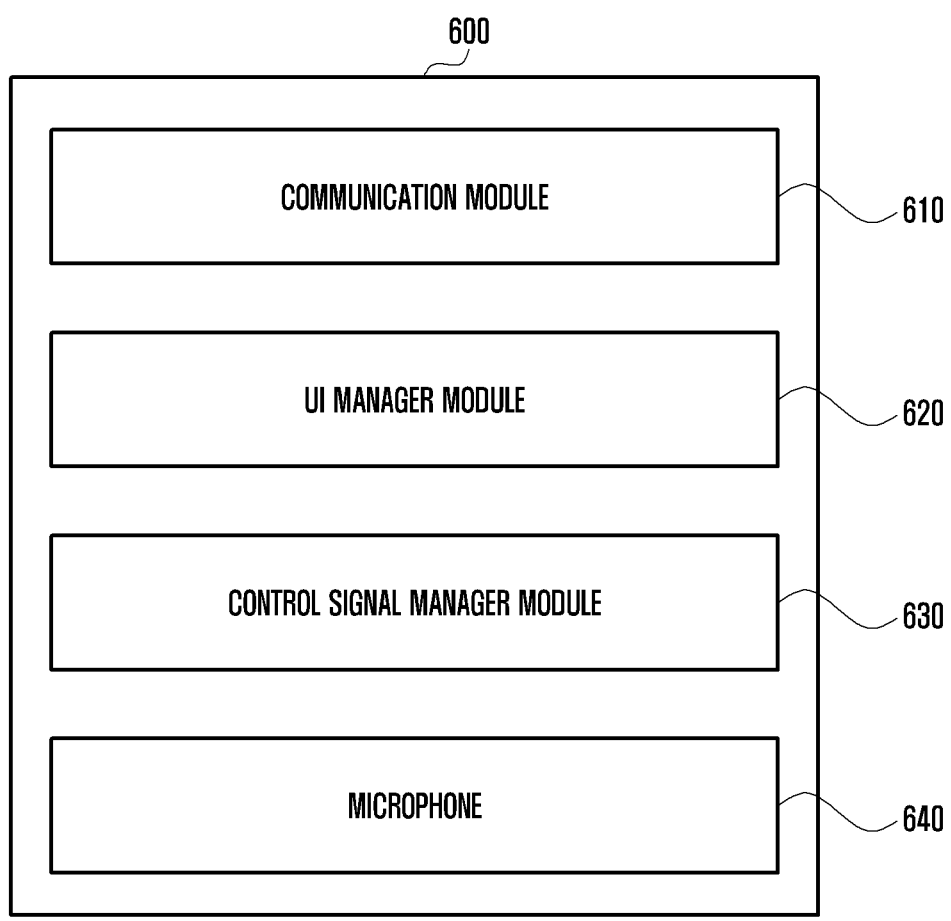
FIG. 10 is a block diagram illustrating an external device according to various embodiments of the present disclosure.

FIG. 10 is a block diagram illustrating an external device (e.g., the first external device 600 of FIG. 1) according to various embodiments of the present disclosure.

The first external device 600 according to various embodiments of the present disclosure may include a communication module (e.g., including communication circuitry) 610, a user interface (UI) manager module (e.g., including processing circuitry and/or program elements) 620, a control signal manager module (e.g., including processing circuitry and/or program elements) 630 and a microphone 640.

The communication module 610 may include various communication circuitry and transmit/receive data to/from an intelligence server (e.g., the intelligence server 200 of FIG. 1) or a cloud server (e.g., the cloud server 500 of FIG. 1). In accordance with various embodiments of the present disclosure, the communication module 610 may receive information on partial landing transmitted by the intelligence server 200 or the cloud server 500 or data indicating that an additional user input is necessary. The communication module 610 may transmit an additional user input to the intelligence server 200 or the cloud server 500. The LM module (e.g., the LM module 270 of FIG. 4) of the intelligence server 200 may generate a new path rule using an additional user input. A user terminal (e.g., the user terminal 100 of FIG. 1) may execute a task using a new path rule.

The UI manager module 620 may include various processing circuitry and/or program elements and generate an interface for receiving an additional user input using information on partial landing transmitted by the intelligence server 200 or the cloud server 500.

When data for outputting a user interface transmitted by the intelligence server 200 or the cloud server 500 is received, the UI manager module 620 may generate a user interface using information on partial landing, information of the first external device 600 or data for outputting a user interface.

In accordance with various embodiments of the present disclosure, the UI manager module 620 may differently generate a user interface based on information (e.g., whether a display is included, information on resolution of a display or whether a speaker is included) of the first external device 600.

In accordance with various embodiments of the present disclosure, if a visual element (e.g., a displayed image in a user input for selecting an image) is necessary to receive an additional parameter, the UI manager module 620 may generate a user interface including a visual element.

In accordance with various embodiments of the present disclosure, the UI manager module 620 may differently generate a user interface by taking into consideration display information (e.g., maximum-supportable resolution, whether a video standard (e.g., a codec, such as H. 264 or H. 265) is supported or the size of a display) of the first external device 600. If the first external device 600 is TV that supports up to ultra high definition (UHD) resolution, the UI manager module 620 may generate a user interface including a lot of information. The user interface may be displayed in a floating state on a screen that is already displayed on the display or may be displayed in a region generated by dividing a display.

For another example, if the size of the display of the first external device 600 is a given size or less and unsuitable for displaying a lot of information, the UI manager module 620 may generate a simple user interface including a small amount of information.

In accordance with various embodiments of the present disclosure, the UI manager module 620 may generate a user interface including a sound that induces a user input to be performed in voice in order to receive an additional parameter.

The control signal manager module 630 may include various processing circuitry and/or program elements and perform processing on a user input for an additional parameter. The control signal manager module 630 may receive a user input and obtain parameter information based on information of a user interface matched with the user input.

Although not shown, the first external device 600 according to various embodiments of the present disclosure may further include a display. The first external device 600 may receive an additional parameter based on a user input on the display.

The first external device 600 according to various embodiments of the present disclosure may include the microphone 640. The first external device 600 may receive a user voice input, including a request or additional parameter for performing a task, using the microphone 640. The first external device 600 according to various embodiments of the present disclosure may pre-process a received user input using the microphone 640 and transmit the pre-processed user input to the intelligence server 200.

Figure 11A:
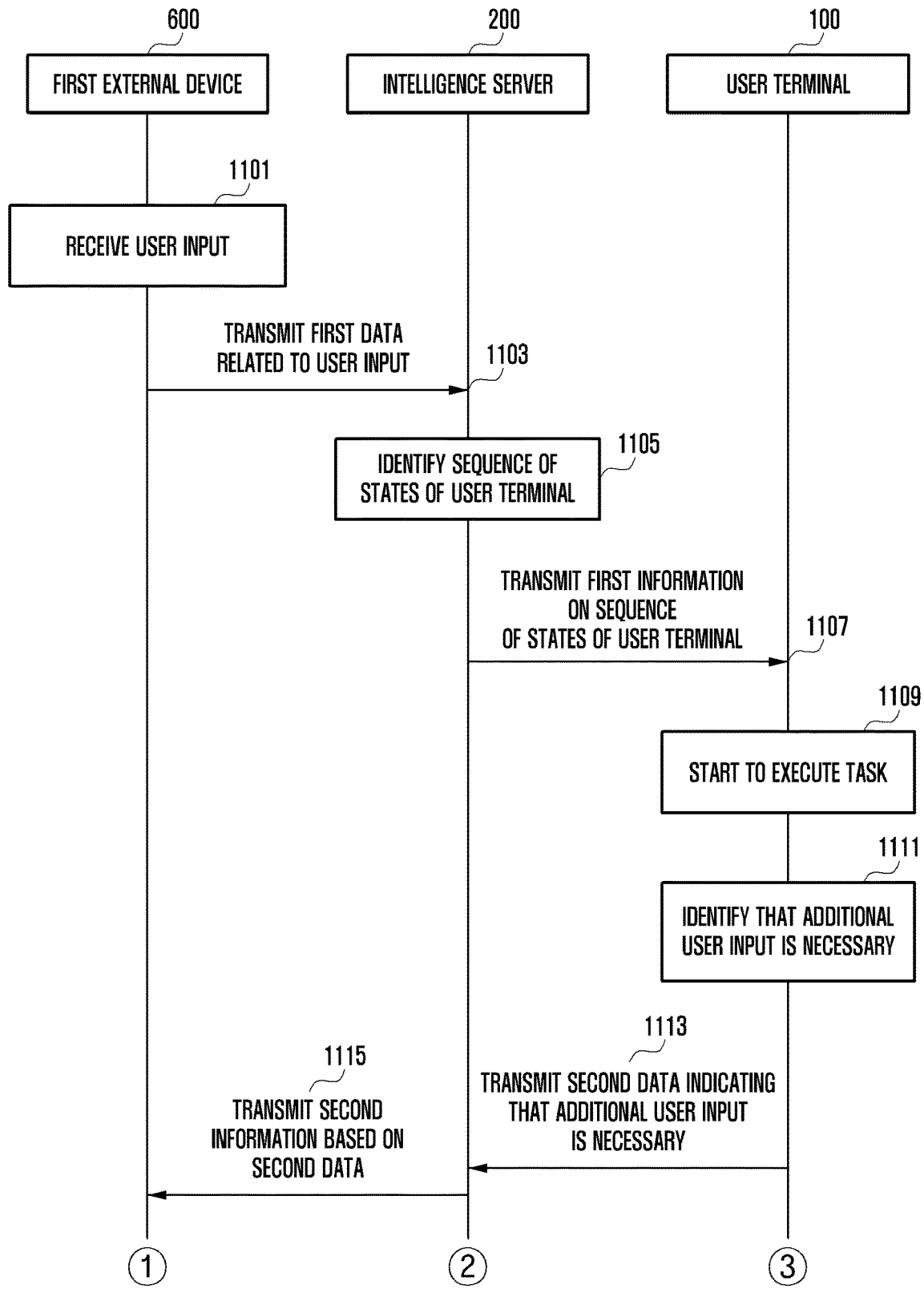
FIGS. 11A and 11B are flowcharts illustrating an embodiment if an additional user input is necessary in the integrated intelligence system according to various embodiments of the present disclosure.
Figure 11B:
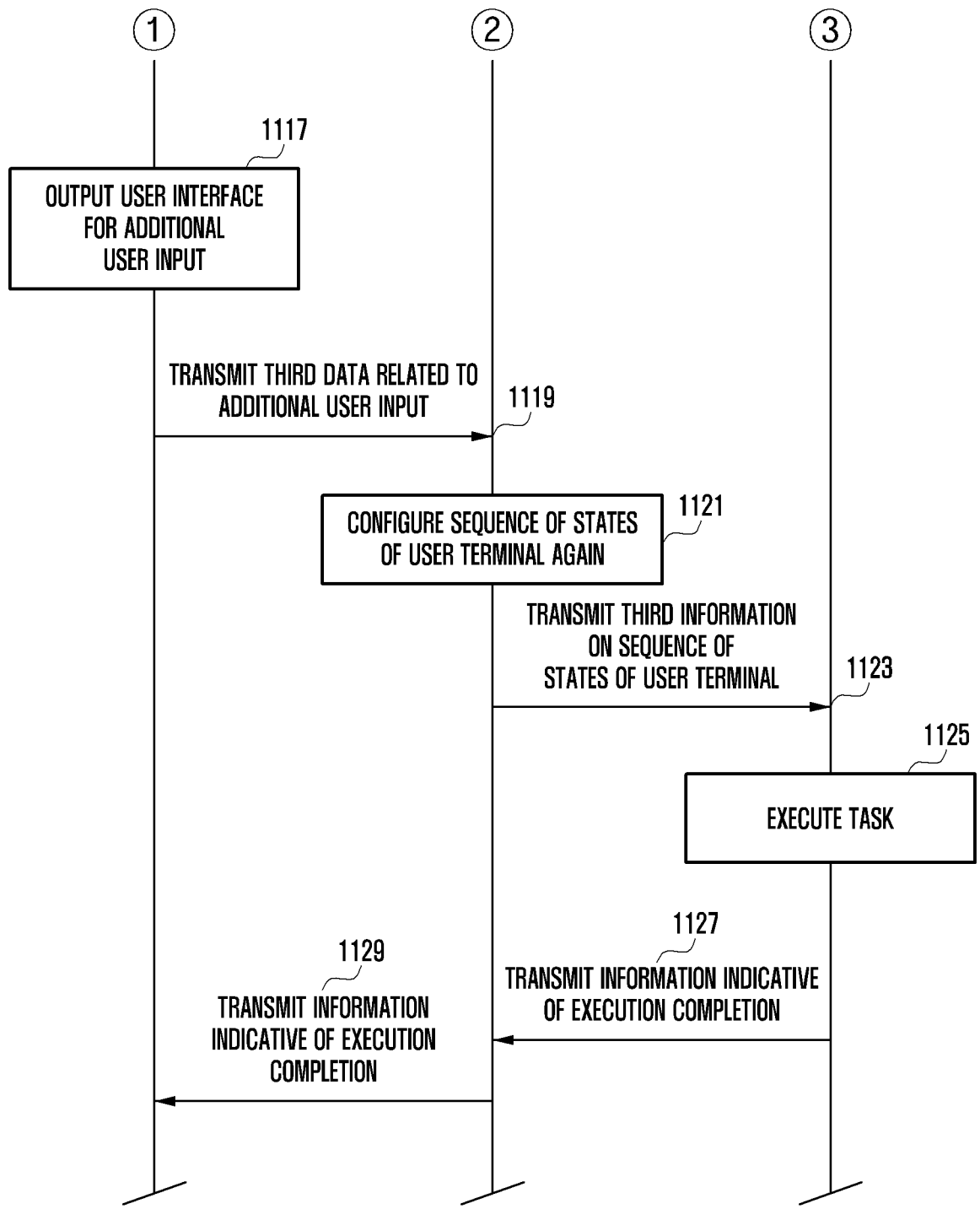

FIGS. 11A and 11B are flowcharts illustrating an embodiment in which a user input is received and processed (FIG.

11A) and an embodiment performed when an additional user input is necessary (FIG. 11B) in the integrated intelligence system according to various embodiments of the present disclosure.

The embodiments illustrated in FIGS. 11A and 11B may be performed between a first external device (e.g., the first external device 600 of FIG. 1), an intelligence server (e.g., the intelligence server 200 of FIG. 1), and a user terminal (e.g., the user terminal 100 of FIG. 1).

At operation 1101, the first external device 600 according to an embodiment may receive a user input. In accordance with various embodiments of the present disclosure, the first external device 600 may receive a user input in the state in which an application capable of processing a user input (e.g., a voice command processing application) has been executed. The user input may be supported in various manners based on a user interface supported by the first external device 600. For example, the first external device 600 including a microphone may receive a user input including a user's voice data. The user's voice data may refer, for example, to a voice that requests an operation of controlling various functions capable of being performed in the user terminal 100. For example, the user input may refer, for example, to a voice that requests an operation of transmitting a message, including given contents (e.g., "Say I am late today"), to given contact information (e.g., mother) included in stored contact information in the user terminal 100. For another example, the user input may refer, for example, to a voice that requests an operation of executing one of various applications stored in the user terminal 100. In addition, the user input may refer, for example, to a voice including a request for performing a task that controls various functions capable of being performed in the user terminal 100.

In accordance with various embodiments of the present disclosure, the first external device 600 may receive a user input after performing a user's authentication. The user's authentication may be performed in various manners. For example, the first external device 600 may receive biometric information (e.g., fingerprint, an iris, facial features or a voice) of the user, and may perform the reception of a user input based on a result of a comparison between the received biometric information and stored user biometric information.

In accordance with various embodiments of the present disclosure, the first external device 600 may perform a process of registering user biometric information. For example, the first external device 600 may receive a token capable of accessing an intelligence server (e.g., the intelligence server 200 of FIG. 1) from a different external device (e.g., the user terminal 100 or the intelligence server 200 of FIG. 1). In this case, a user may input the user's biometric information (e.g., a user's fingerprint) to the first external device 600 (e.g., register the user's fingerprint). The user's biometric information (e.g., fingerprint data) may be stored in the memory of the first external device 600. In accordance with various embodiments of the present disclosure, the first external device 600 may connect the biometric information (e.g., fingerprint data), stored in the memory of the first external device 600, and the token. In accordance with various embodiments of the present disclosure, the first external device 600 may perform user authentication using biometric information (e.g., a user's fingerprint) input by a user. The first external device 600 may compare the input biometric information with biometric information stored in the memory. If the input biometric information is substantially identical with the biometric information stored in the memory, the first external device 600 may transmit a token, connected to the biometric information stored in the memory, to the intelligence server 200 along with a user input (e.g., a user's voice input), so a function related to the user input is performed. In accordance with various embodiments of the present disclosure, the first external device 600 may include a separate fingerprint input unit for fingerprint recognition. Various input methods (e.g., an optical type, an electrical type or ultrasonic-based fingerprint recognition) may be applied to a fingerprint input method. For the fingerprint recognition, the first external device 600 may control the fingerprint input unit to store a user's fingerprint.

In accordance with various embodiments of the present disclosure, the first external device 600 may perform user authentication using a user's voice received for a voice command. For example, the first external device 600 does not receive a separate user input for user authentication, and may perform user authentication using a user input received for a voice command.

In accordance with various embodiments of the present disclosure, after user authentication, the first external device 600 may be permitted to access an internal security region. The first external device 600 may perform communication with the intelligence server 200 using a token stored in the internal security region.

In accordance with various embodiments of the present disclosure, if users who use the first external device 600 are plural, the first external device 600 may analyze user's voices (based on frequencies or voice patterns) and divide the users based on a result of the analysis. The first external device 600 may divide a plurality of users and provide various functions suitable for the users. For example, the first external device 600 may provide a function corresponding to each user, such as that a given function (e.g., a function of activating the function of a given application in response to a voice input "High Galaxy") corresponding to a specific input (e.g., a voice input "High Galaxy") designated by a given user of a plurality of user is performed.

In accordance with various embodiments of the present disclosure, the first external device 600 identifies the location of the user terminal 100. If, as a result of the identification, the location of the user terminal 100 is a previously registered location (e.g., if the user terminal 100 is positioned near a reliable device), the first external device 600 does not perform user authentication, and may perform various operations, such as user input reception.

At operation 1103, the first external device 600 according to an embodiment may transmit first data related to the user input to the intelligence server 200. In accordance with various embodiments of the present disclosure, the first data may include data corresponding to the user input and information on a user interface of the first external device 600. The information on the user interface of the first external device 600 may refer, for example, to the type or information of various user interfaces included in the first external device 600. For example, if the first external device 600 includes a display, information on various user interfaces, such as whether the display can support a touch input or resolution of the display, may be included in the first data. For another example, information on whether the first external device 600 includes a speaker may also be included in the first data.

In accordance with various embodiments of the present disclosure, if the user input includes speech data, the intelligence server 200 may convert the speech data into text data using an ASR module (e.g., the ASR module 210 of FIG. 4).

The intelligence server 200 may obtain a user's intent and a parameter from the text data using an NLU module (e.g., the NLU module 220 of FIG. 4).

At operation 1105, the intelligence server 200 according to an embodiment may generate the sequence (e.g., path rule) of states of the user terminal 100 using a user's intent and a parameter. The sequence of states of the user terminal 100 may refer, for example, to the sequence of several states for executing a task. For example, in order to execute a task of transmitting a given message to a given user using a short message service application (e.g., the first app of FIG. 5), three states in which the short message service application is first executed (e.g., A of FIG. 5), the given user is selected (e.g., B of FIG. 5), and the message is then entered (e.g., C of FIG. 5) and transmitted may be sequentially performed. The intelligence server 200 according to various embodiments of the present disclosure may generate the sequence of states of the user terminal 100.

At operation 1107, the intelligence server 200 according to an embodiment may transmit first information on the sequence of the states to any one of external devices. The intelligence server 200 according to various embodiments of the present disclosure may analyze the first information, and may identify that the first information will be transmitted to which external device based on a result of the analysis. The intelligence server 200 may identify an external device on which a task corresponding the first information needs to be performed, and may transmit the first information to the identified external device. The embodiments described in FIGS. 11A and 11B may refer, for example, to embodiments in which the user terminal 100 is identified as a device on which the first information will be performed, but the present disclosure is not limited to the embodiments described in FIGS. 11A and 11B. For example, the intelligence server 200 may transmit the first information to an external device (e.g., an electronic device such as a refrigerator) other than a user terminal. The external device that has received the first information may execute a task corresponding to the first information.

At operation 1109, the user terminal 100 according to an embodiment may execute a task using the first information. The user terminal 100 according to various embodiments of the present disclosure may execute a task corresponding to the first information using the sequence of states of the user terminal 100 included in the first information.

At operation 1111, the user terminal 100 according to an embodiment may identify (determine) whether an additional parameter is necessary during the task execution. In accordance with various embodiments of the present disclosure, an essential parameter for executing a task in executing the task may be defined. For example, in order to execute a task of transmitting a text message, an essential parameter, such as a parameter indicative of the recipient of the message, a parameter including the contents of the message or a parameter indicative of an application to be executed, may be necessary. In various situations, such as that an essential parameter is not present in a user input or ambiguous, the user terminal 100 may identify whether an additional parameter is necessary. In accordance with various embodiments of the present disclosure, if an additional parameter is necessary, the user terminal 100 may transmit second data, indicating that an additional user input is necessary, to the intelligence server 200 at operation 1113. In accordance with various embodiments of the present disclosure, the second data may include data indicating that the user terminal 100 is subjected to partial landing or information on an additional parameter.

In accordance with various embodiments of the present disclosure, when partial landing occurs in the user terminal 100, the intelligence server 200 may identify an external device that belongs to external devices and that will perform an operation of receiving a user input for a deficient parameter. Alternatively, when partial landing occurs in the user terminal 100, the intelligence server 200 may identify an external device that belongs to external devices and that will transmit a user interface for a user input for a deficient parameter.

In accordance with various embodiments of the present disclosure, the intelligence server 200 may identify an external device that will perform an operation (e.g., an operation of receiving a user input including information on an additional parameter) for receiving an additional parameter using an LM module (e.g., the LM module 270 of FIG. 4). In accordance with various embodiments of the present disclosure, the information on the additional parameter may include a list of applications that may be selected by a user, contact information for selecting a user with which communication will be performed, or information (e.g., metadata) on a file that may be selected by a user.

In accordance with various embodiments of the present disclosure, the intelligence server 200 may identify an external device that receives a user input, including information on an additional parameter, based on the intent of a user's speech included in the user input. The intelligence server 200 may identify a selected external device as an external device that will perform an operation of receiving an additional parameter if the external device that needs to perform the operation is explicitly selected (or if the external device can be identified) during the user input. For example, when a user performs a user input "Show me a photo through TV", the TV may be selected to perform an operation of displaying the photo. In this case, the intelligence server 200 may identify the TV so that the TV executes an operation of receiving an additional parameter (e.g., an operation of displaying a screen for receiving the photo to be displayed).

In accordance with various embodiments of the present disclosure, the intelligence server 200 may identify an external device that receives a user input including information on an additional parameter based on a user's location. The intelligence server 200 may identify the place or the current location of a user where a user input has been received, and may identify an external device within a previously set range from the identified location of the user as an external device that receives the user input. In accordance with various embodiments of the present disclosure, a user's location may be collected from various external devices (e.g., the first external device 600 of FIG. 1) connected to the intelligence server 200.

In accordance with various embodiments of the present disclosure, the intelligence server 200 may identify an external device that receives a user input including information on an additional parameter based on the characteristics of the external device. The intelligence server 200 may receive second data for a request for an additional user input and analyze the second data.

In accordance with various embodiments of the present disclosure, the intelligence server 200 may identify whether an external device may perform the reception of an additional parameter by taking into consideration the characteristics of the parameter, such as the amount of information to be displayed, based on a result of the analysis of second data. For example, the intelligence server 200 may identify that an additional parameter needs to be received in such a way as to select a photo based on a result of the analysis of the characteristics of the parameter. The intelligence server 200 may identify an external device including a display as an external device that receives a user input including information on an additional parameter.

For another example, the intelligence server 200 may identify the number of photos to be selected when it receives an additional parameter in such a way as to select the photos. The intelligence server 200 may identify an external device that receives a user input including information on an additional parameter by taking into consideration the number of photos or the characteristics of the external device (e.g., the size of a display or resolution).

In accordance with various embodiments of the present disclosure, the intelligence server 200 may identify an external device that receives a user input including information on an additional parameter based on priority of the external device. The priority may be set by a user or the intelligence server 200 may set the priority based on a result of the analysis of a user's use pattern. The intelligence server 200 may identify an external device having high priority as an external device that receives a user input including information on an additional parameter. In accordance with various embodiments of the present disclosure, the intelligence server 200 may assign higher priority to an external device that has received a user's speech input than to other external devices. In the embodiments shown in FIGS. 11A and 11B, the intelligence server 200 may assign higher priority to the first external device 600 than to other external devices because the first external device 600 has received a user's speech input.

In accordance with various embodiments of the present disclosure, the intelligence server 200 may assign higher priority to an external device that belongs to external devices registered by a user and that is frequently used by the user than to other external devices. In accordance with various embodiments of the present disclosure, the intelligence server 200 may assign higher priority to an external device predicted to be present within a distance close to a user than to other external devices. For example, higher priority may be assigned to a wearable external device (e.g., a wearable device) compared to other external devices.

In accordance with various embodiments of the present disclosure, the intelligence server 200 may identify an external device that receives a user input including information on an additional parameter based on a result of the analysis of a user's pattern. The intelligence server 200 may analyze a user's behavior pattern (e.g., the behavior pattern of a user who watches TV in a living room at a given time or a user's sleep pattern) collected by the user terminal 100, and may identify a given external device as an external device that receives a user input including information on an additional parameter based on a result of the analysis.

At operation 1115, the intelligence server 200 according to an embodiment may transmit second information, indicating that an additional user input for completing the task is necessary, to the identified external device (e.g., the first external device 600).

In accordance with various embodiments of the present disclosure, the second information may include information on a parameter (e.g., a list of applications that may be selected by a user input or a contact information list that may be selected by a user input) necessary to perform the task or information on the configuration of a user interface for an additional user input. In accordance with various embodiments of the present disclosure, the second information may be generated based on second data. The second information may include data for generating a user interface to be output by the first external device 600 based on the second data.

In accordance with various embodiments of the present disclosure, the electronic device 200 may differently generate a user interface for an additional user input based on the characteristics of the first external device 600. For example, if the external device 600 does not include a display, the electronic device 200 may generate a user interface related to an additional user input including elements other than a visual element. For example, if the external device 600 includes a display, but does not include a speaker, the electronic device 200 may generate a user interface for an additional user input including elements (e.g., visual elements) other than an acoustic element.

At operation 1117, the external device 600 according to an embodiment may output a user interface for a user's additional input (e.g., a UI screen that requires a user's additional selection or a speech output that requires a user's additional speech) based on the received second data, and may receive the additional user input.

In accordance with various embodiments of the present disclosure, the user interface for the user's additional input may be generated in any one of the first external device 600 and the intelligence server 200. In accordance with another embodiment of the present disclosure, the user interface for the user's additional input may also be generated in the cloud server 500.

In accordance with various embodiments of the present disclosure, the first external device 600 may generate a user interface for a user's additional input using a UI manager module (e.g., the UI manager module 620 of FIG. 10).

In accordance with various embodiments of the present disclosure, the first external device 600 may process a user's additional input (e.g., a voice command) using a control signal manager module (e.g., the control signal manager module 630 of FIG. 10).

At operation 1119, the first external device 600 according to an embodiment may transmit third data related to the additional user input to the intelligence server. In accordance with various embodiments of the present disclosure, the third data may be differently configured based on a user's input. For example, if the first external device 600 receives a user's speech input using a microphone, the third data may be configured in a voice PCM data form corresponding to the user's input. For another example, if the first external device 600 receives a user's input using the display of the first external device, the third data may be configured in a text data form corresponding to the user's input.

At operation 1121, the intelligence server 200 according to an embodiment may configure the sequence (path rule) of states of the user terminal again based on the third data. Since a parameter has been added due to the user's additional user input, the intelligence server 200 may configure the path rule again using the added parameter and the existing parameter again.

At operation 1123, the intelligence server 200 according to an embodiment may transmit third information on the sequence of states of the user terminal to the user terminal 100. In accordance with various embodiments of the present disclosure, the third information may be implemented in a form in which the parameter added by the additional user input has been added to the first information.

At operation 1125, the user terminal 100 according to an embodiment may execute a task using the sequence of states of the user terminal included in the third information. In accordance with various embodiments of the present disclosure, the user terminal 100 may compare the sequence of states of the user terminal generated at operation 1103 with the sequence of states of the user terminal generated at operation 1125, may omit the execution of redundant states, and may execute the task again from a non-redundant state. In accordance with another embodiment of the present disclosure, the user terminal 100 may terminate the task performed using the sequence of states of the user terminal generated at operation 1105, and may perform the task again using the sequence of states of the user terminal generated at operation 1125.

At operation 1127, the user terminal 100 according to an embodiment may transmit information, indicating that the execution of the task has been completed, to the intelligence server 200.

At operation 1129, the intelligence server 200 according to an embodiment may transmit information, indicating the completion of the execution of the task, to the first external device 600. In accordance with various embodiments of the present disclosure, the first external device 600 may output the information indicative of the completion of the execution using various user interfaces (e.g., a speaker or a display) included in the first external device 600.

In accordance with various embodiments of the present disclosure, the integrated intelligence system may further include the cloud server 500. If the integrated intelligence system additionally includes the cloud server 500, the cloud server 500 may perform various operations that belong to operations executed by the intelligence server 200 and that include an operation of identifying an external device that will receive an additional user input and an operation of generating a user interface for an additional user input. In this case, the intelligence server 200 may perform an operation of transmitting/receiving data while operating in conjunction with various electronic devices, such as the user terminal 100 and the cloud server 500 connected to the intelligence server 200. An operation of identifying an external device that will receive an additional user input and an operation of generating a user interface for an additional user input may be performed by the cloud server 500 not the intelligence server 200.

Figure 12B:
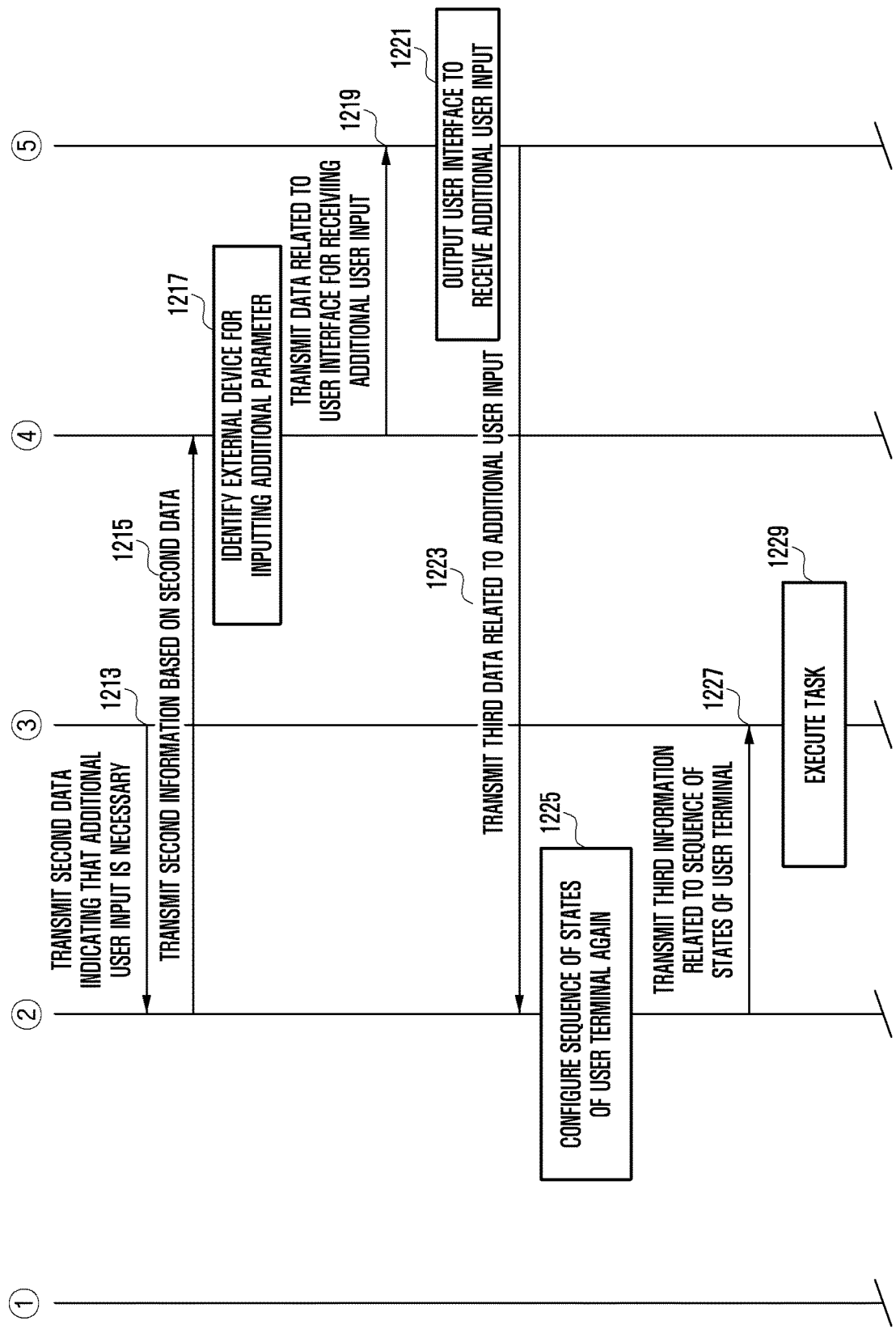

FIGS. 12A and 12B are flowcharts illustrating an embodiment in which a user input is received and processed (FIG. 12A) and an embodiment performed when an additional user input is necessary (FIG. 12B) in the integrated intelligence system according to various embodiments of the present disclosure.

The embodiments shown in FIGS. 12A and 12B may be performed between a first external device (e.g., the external device 600 of FIG. 1), an intelligence server (e.g., the intelligence server 200 of FIG. 1), a user terminal (e.g., the user terminal 100 of FIG. 1), a cloud server (e.g., the cloud server 500 of FIG. 1), and the second external device 700.

In accordance with various embodiments of the present disclosure, the cloud server 500 may store information on the first external device 600 and the second external device 700 connected to the cloud server 500. Various external devices connected to the cloud server 500 may refer, for example, to external devices whose user authentication has been completed.

At operation 1201, the first external device 600 according to an embodiment may receive a user input. In accordance with various embodiments of the present disclosure, the first external device 600 may receive the user input in the state in which an application capable of processing a user input (e.g., a voice command processing application) has been executed. The user input may be supported in various ways based on a user interface supported by the first external device 600. For example, the first external device 600 including a microphone may receive a user input including a user's voice data. The user's voice data may refer, for example, to a voice that requests an operation of controlling various functions capable of being performed by the user terminal 100. For example, the user input may refer, for example, to a voice that requests an operation of transmitting a message, including given contents (e.g., "Say I am late today"), to given contact information (e.g., mother) included in stored contact information in the user terminal 100. For another example, the user input may refer, for example, to a voice that requests an operation of executing one of various applications stored in the user terminal 100. In addition, the user input may refer, for example, to a voice including a request for performing a task that controls various functions capable of being performed in the user terminal 100.

In accordance with various embodiments of the present disclosure, the first external device 600 or the second external device 700 may receive a user input after performing a user's authentication prior to the reception of the user input. The user's authentication may be performed in various manners. For example, the first external device 600 may receive biometric information (e.g., fingerprint, an iris, facial features or a voice) of the user, and may perform the reception of a user input based on a result of a comparison between the received biometric information and stored user biometric information.

In accordance with various embodiments of the present disclosure, after the user authentication, the first external device 600 or the second external device 700 may be permitted to access an internal security region. The first external device 600 or the second external device 700 may perform communication with the intelligence server 200 using a token stored in the internal security region.

In accordance with various embodiments of the present disclosure, if users who use the first external device 600 or the second external device 700 are plural, the first external device 600 or the second external device 700 may analyze user's voices (based on frequencies or voice patterns) and divide the users based on a result of the analysis.

In accordance with various embodiments of the present disclosure, the first external device 600 or the second external device 700 identifies the location of the user terminal 100. If, as a result of the identification, the location of the user terminal 100 is a previously registered location (e.g., if the user terminal 100 is positioned near a reliable device), the first external device 600 or the second external device 700 does not perform user authentication, and may perform various operations, such as user input reception.

At operation 1203, the first external device 600 according to an embodiment may transmit first data related to the user input to the intelligence server 200. In accordance with various embodiments of the present disclosure, the first data may include data corresponding to the user input and information on a user interface of the first external device 600. The information on the user interface of the first external device 600 may refer, for example, to the type or information of various user interfaces included in the first external device 600. For example, if the first external device 600 includes a display, information on various user interfaces, such as whether the display can support a touch input or resolution of the display, may be included in the first data. For another example, information on whether the first external device 600 includes a speaker may also be included in the first data.

In accordance with various embodiments of the present disclosure, if the user input includes speech data, the intelligence server 200 may convert the speech data into text data using an ASR module (e.g., the ASR module 210 of FIG. 4). The intelligence server 200 may obtain a user's intent and a parameter from the text data using an NLU module (e.g., the NLU module 220 of FIG. 4).

At operation 1205, the intelligence server 200 according to an embodiment may generate the sequence (e.g., path rule) of states of the user terminal 100 using a user's intent and a parameter. The sequence of states of the user terminal 100 may refer, for example, to the sequence of several states for executing a task. For example, in order to execute a task of transmitting a given message to a given user using a short message service application (e.g., the first app of FIG. 5), three states in which the short message service application is first executed (e.g., A of FIG. 5), the given user is selected (e.g., B of FIG. 5), and the message is then entered (e.g., C of FIG. 5) and transmitted may be sequentially performed. The intelligence server 200 according to various embodiments of the present disclosure may generate the sequence of states of the user terminal 100.

At operation 1207, the intelligence server 200 according to an embodiment may transmit first information on the sequence of the states to the user terminal 100.

At operation 1209, the user terminal 100 according to an embodiment may execute a task using the first information. The user terminal 100 according to various embodiments of the present disclosure may execute the task corresponding to the first information using the sequence of states of the user terminal 100 included in the first information.

At operation 1211, the user terminal 100 according to an embodiment may identify whether an additional parameter is necessary while executing the task. In accordance with various embodiments of the present disclosure, an essential parameter for executing a task in executing the task may be defined. For example, in order to execute a task of transmitting a text message, an essential parameter, such as a parameter indicative of the recipient of the message, a parameter including the contents of the message or a parameter indicative of an application to be executed, may be necessary. In various situations, such as that an essential parameter is not present in a user input or ambiguous, the user terminal 100 may identify whether an additional parameter is necessary.

If an additional parameter is necessary, the user terminal 100 may transmit second data, indicating that an additional user input is necessary, to the intelligence server 200 at operation 1213. In accordance with various embodiments of the present disclosure, the second data may include data indicating that the user terminal 100 is subjected to partial landing or information on an additional parameter.

At operation 1215, the intelligence server 200 may transmit second information based on the second data indicating that an additional user input is necessary to the cloud server 500.

In accordance with various embodiments of the present disclosure, the cloud server 500 may identify whether an additional user input may be performed in the first external device 600 based on the second information. For example, if the amount of information to be displayed for a user is much (e.g., a situation in which many photos need to be displayed in a gallery), the display of the first external device 600 may be inappropriate for displaying a lot of information. The cloud server 500 may identify that an additional user input should be performed in a different external device not the first external device 600.

At operation 1217, the cloud server 500 according to an embodiment may identify an external device for inputting an additional parameter based on the second information transmitted by the intelligence server 200.

In accordance with various embodiments of the present disclosure, the cloud server 500 may identify an external device that will perform an operation of receiving an additional parameter (e.g., an operation of receiving a user input including information on an additional parameter) using a PL manager module (e.g., the PL manager module 520 of FIG. 9). In accordance with various embodiments of the present disclosure, the information on the additional parameter may include a list of applications that may be selected by a user, contact information for selecting a user with which communication will be performed or information (e.g., metadata) on a file that may be selected by a user.

In accordance with various embodiments of the present disclosure, the cloud server 500 may identify an external device that receives a user input, including information on an additional parameter, based on the intent of a user's speech included in the user input. The intelligence server 200 may identify a selected external device as an external device that will perform an operation of receiving an additional parameter if the external device that needs to perform the operation is explicitly selected (or if the external device can be identified) during the user input. For example, when a user performs a user input "Show me a photo through TV", the TV may be selected to perform an operation of displaying the photo. In this case, the cloud server 500 may identify the TV so that the TV executes an operation of receiving an additional parameter (e.g., an operation of displaying a screen for receiving the photo to be displayed).

In accordance with various embodiments of the present disclosure, the cloud server 500 may identify an external device that receives a user input including information on an additional parameter based on a user's location. The cloud server 500 may identify the place or the current location of a user where a user input has been received, and may identify an external device within a previously set range from the identified location of the user as an external device that receives the user input. In accordance with various embodiments of the present disclosure, a user's location may be collected from various external devices (e.g., the first external device 600 of FIG. 1) connected to the cloud server 500.

In accordance with various embodiments of the present disclosure, the cloud server 500 may identify an external device that receives a user input including information on an additional parameter based on the characteristics of the external device. The cloud server 500 may receive second data for a request for an additional user input and analyze the second data.

The cloud server 500 may identify whether an external device may perform the reception of an additional parameter by taking into consideration the characteristics of the parameter, such as the amount of information to be displayed, based on a result of the analysis of second data. For example, the cloud server 500 may identify that an additional parameter needs to be received in such a way as to select a photo based on a result of the analysis of the characteristics of the parameter. The cloud server 500 may identify an external device including a display as an external device that receives a user input including information on an additional parameter.

For another example, the cloud server 500 may identify the number of photos to be selected when it receives an additional parameter in such a way as to select the photos. The cloud server 500 may identify an external device that receives a user input including information on an additional parameter by taking into consideration the number of photos or the characteristics of the external device (e.g., the size of a display or resolution).

In accordance with various embodiments of the present disclosure, the cloud server 500 may identify an external device that receives a user input including information on an additional parameter based on priority of the external device. The priority may be set by a user or the cloud server 500 may set the priority based on a result of the analysis of a user's use pattern. The cloud server 500 may identify an external device having high priority as an external device that receives a user input including information on an additional parameter. In accordance with various embodiments of the present disclosure, the cloud server 500 may assign higher priority to an external device that has received a user's speech input than to other external devices. In the embodiments illustrated in FIGS. 11A and 11B, the cloud server 500 may assign higher priority to the first external device 600 than to other external devices because the first external device 600 has received a user's speech input.

In accordance with various embodiments of the present disclosure, the cloud server 500 may assign higher priority to an external device that belongs to external devices registered by a user and that is frequently used by the user than to other external devices. In accordance with various embodiments of the present disclosure, the cloud server 500 may assign higher priority to an external device predicted to be present within a distance close to a user than to other external devices. For example, higher priority may be assigned to a wearable external device (e.g., a wearable device) compared to other external devices.

In accordance with various embodiments of the present disclosure, the cloud server 500 may identify an external device that receives a user input including information on an additional parameter based on a result of the analysis of a user's pattern. The cloud server 500 may analyze a user's behavior pattern (e.g., the behavior pattern of a user who watches TV in a living room at a given time or a user's sleep pattern) collected by the user terminal 100, and may identify a given external device as an external device that receives a user input including information on an additional parameter based on a result of the analysis.

In accordance with various embodiments of the present disclosure, the cloud server 500 may differently configure an external device to which a user interface for receiving a user's additional input will be output and an external device that receives a user's additional input. In accordance with various embodiments of the present disclosure, the cloud server 500 may identify the second external device 700 as an external device to which a user interface for receiving a user's additional input will be output. Furthermore, the cloud server 500 may identify the first external device 100 as an external device that receives a user's additional input. For example, the cloud server 500 may identify the second external device 700 including a display as an external device that outputs a GUI for receiving a user's additional input. The cloud server 500 may identify the first external device 100 including a microphone as an external device that receives the additional speech of a user in order to receive an additional input using the user's speech. FIGS. 12A and 12B illustrate embodiments in which the second external device 700 has been identified as a device to which a user interface for receiving a user's additional input will be output and an external device that receives a user's additional input, but the present disclosure is not limited thereto. A device to which a user interface for receiving a user's additional input will be output and an external device that receives a user's additional input may be differently configured.

At operation 1219, the cloud server 500 according to an embodiment may transmit second information indicating that an additional user input for completing the task is necessary to the identified external device (e.g., the second external device 700).

In accordance with various embodiments of the present disclosure, the second information may include information on an additional parameter necessary to perform the task (e.g., a list of applications that may be selected by a user input or contact information list that may be selected by a user input) or information on the configuration of a user interface for an additional user input. In accordance with various embodiments of the present disclosure, the second information may be generated based on second data. The second information may include data for generating a user interface to be output by the second external device 700 based on the second data.

In accordance with various embodiments of the present disclosure, the cloud server 500 may differently generate a user interface for an additional user input based on the characteristics of the second external device 700. For example, if the second external device 700 does not include a display, the cloud server 500 may generate a user interface related to an additional user input including elements other than a visual element. For example, if the second external device 700 includes a display, but does not include a speaker, the cloud server 500 may generate a user interface for an additional user input including elements (e.g., visual elements) other than an acoustic element.

At operation 1221, the second external device 700 according to an embodiment may output a user interface for a user's additional input (e.g., a UI screen that requires a user's additional selection or a speech output that requires the additional speech of a user) based on the received second data, and may receive an additional user input.

In accordance with various embodiments of the present disclosure, the user interface for a user's additional input may be generated in any one of the cloud server 500 and the second external device 700.

In accordance with various embodiments of the present disclosure, the second external device 700 may generate a user interface for a user's additional input using a UI manager module (e.g., the UI manager module 620 of FIG. 10).

In accordance with various embodiments of the present disclosure, the second external device 700 may process a user's additional input (e.g., a voice command) using a control signal manager module (e.g., the control signal manager module 630 of FIG. 10).

At operation 1223, the second external device 700 according to an embodiment may transmit third data related to the additional user input to the intelligence server 200. In accordance with various embodiments of the present disclosure, the third data may be differently configured based on a user's input. For example, if the second external device 700 receives a user's speech input using a microphone, the third data may be configured in a voice PCM data form corresponding to the user's input. For another example, if the second external device 700 receives a user's input using the display of the first external device, the third data may be configured in a text data form corresponding to the user's input.

At operation 1225, the intelligence server 200 according to an embodiment may configure the sequence (path rule) of states of the user terminal again based on the third data. In accordance with various embodiments of the present disclosure, since a parameter has been added due to the user's additional user input, the intelligence server 200 may configure the path rule again using the added parameter and the existing parameter again.

At operation 1227, the intelligence server 200 according to an embodiment may transmit third information on the sequence of states of the user terminal to the user terminal 100.

At operation 1229, the user terminal 100 according to an embodiment may execute the task using the sequence of states of the user terminal included in the third information. In accordance with various embodiments of the present disclosure, the user terminal 100 may compare the sequence of states of the user terminal generated at operation 1203 with the sequence of states of the user terminal generated at operation 1225, may omit the execution of redundant states, and may execute the task again from a non-redundant state. In accordance with another embodiment of the present disclosure, the user terminal 100 may terminate the task performed using the sequence of states of the user terminal generated at operation 1205, and may perform the task again using the sequence of states of the user terminal generated at operation 1225.

FIGS. 13, 14, 15, 16, 17 and 18 are diagrams illustrating embodiments in which an additional user input is performed using an external device in an electronic device according to various embodiments of the present disclosure.

In accordance with various embodiments of the present disclosure, the intelligence server 200 may transmit information on partial landing to the first external device 600 based on second data transmitted by the user terminal 100. The first external device 600 may output a user interface for receiving an additional parameter.

FIG. 13 illustrates an embodiment in which partial landing has occurred due to the omission of some parameters (e.g., the omission of a parameter to select an application to be transmitted) while processing a user input for photo transmission. Referring to FIG. 13, a first external device 1300 may display a list 1310 of applications that will perform photo transmission. In accordance with various embodiments of the present disclosure, a second external device 700 may include a microphone 710 or a fingerprint input unit (e.g., including fingerprint input circuitry) 720.

In accordance with various embodiments of the present disclosure, the second external device 700 may receive a user input for controlling the first external device 1300. For example, the second external device 700 may receive a user input for selecting one application 1320 of applications included in an application list 1310 using a manipulation of the second external device 700. The first external device 1300 may transmit a manipulation signal (or selected application information) to the intelligence server 200 or the cloud server 500 in response to the manipulation input by the user.

In accordance with another embodiment, the second external device 700 may receive a user input for selecting one of applications included in the application list 1310 through a voice input.

FIG. 14 illustrates an embodiment in which partial landing has occurred due to the omission of some parameters (e.g., the omission of a parameter to select a photo to be transmitted) while processing a user input for photo transmission. Referring to FIG. 14, a first external device 1400 may display a list 1410 of photos to be transmitted.

In accordance with various embodiments of the present disclosure, the list 1410 of photos may include second data transmitted from the user terminal 100 to the intelligence server 200.

A second external device 700 (e.g., the second external device 700 of FIG. 12A) may include various input/output means in order to receive an additional parameter. For example, the second external device 700 may receive a user's voice input because it includes a microphone 710. The received voice input may be used to receive an additional parameter. For another example, the second external device 700 may receive a user input on a display (not shown) because it includes the display. The received user input may be used to receive an additional parameter.

In accordance with various embodiments of the present disclosure, the second external device 700 may receive biometric information of a user input by the user. In order to receive biometric information of a user, the second external device 700 may include a fingerprint input unit 720. Various input methods (e.g., an optical type, an electrical type or ultrasonic-based fingerprint recognition, or the like) may be applied to the fingerprint input unit 720. The second external device 700 may control the fingerprint input unit 720 in order to register a user's fingerprint. The second external device 700 may register a user's fingerprint, and may perform user authentication by transmitting the registered user fingerprint to an intelligence server (e.g., the intelligence server 200 of FIG. 1) or a cloud server (e.g., the cloud server 500 of FIG. 1). The second external device 700 may complete user authentication and perform various tasks while operating in conjunction with the intelligence server 200 or the cloud server 500.

In accordance with various embodiments of the present disclosure, the second external device 700 may receive an accessible token from the intelligence server 200. The second external device 700 may connect a user fingerprint, stored in the memory, and the accessible token.

In accordance with various embodiments of the present disclosure, the second external device 700 may receive a user's fingerprint and perform a task of comparing the received user's fingerprint with a registered user fingerprint. If, as a result of the comparison, the received user's fingerprint and the registered user fingerprint are substantially identical, the second external device 700 may transmit a token connected to the registered user fingerprint to the intelligence server 200 so that a function related to a user input (e.g., voice input) may be performed.

In accordance with various embodiments of the present disclosure, the second external device 700 may receive the fingerprint of each of a plurality of users and registers the fingerprints of the plurality of users. The second external device 700 may receive a user fingerprint, and may identify a user who belongs to the plurality of users and who corresponds to the received user fingerprint. The second external device 700 may provide various functions suitable for the identified user.

In accordance with various embodiments of the present disclosure, the second external device 700 may receive a user input including a manipulation for a second external device (e.g., the second external device 700 of FIG. 12A) capable of controlling the first external device 1400. For example, the second external device 700 may receive a user input for selecting one photo 1420 of photos included in the photo list 1410 using a manipulation of the second external device 700. The first external device 1400 may transmit a manipulation signal (or selected photo information) to the intelligence server 200 or the cloud server 500 in response to a manipulation input by a user.

In accordance with an embodiment of the present disclosure, it may be difficult to perform an additional user input for selecting a photo through a voice (e.g., selecting a plurality of photos using a voice may be difficult). In this case, a user input for selecting a photo may be received through a touch input using the display of the first external device 1400 or the second external device 700 or a button manipulation for the external device 700.

In accordance with another embodiment of the present disclosure, an additional user input for selecting a photo may be performed in voice using a microphone (e.g., the microphone 710 of FIG. 14). If a selection condition for a photo (e.g., if the time and place where a photo was photographed or a first photo or a second photo is selected) is input through a voice, the first external device 1400 may transmit third data related to a user input, including speech data, to the intelligence server 200 or the cloud server 500. The intelligence server 200 or the cloud server 500 may generate information on the sequence of states of a new terminal using the received third data.

In accordance with various embodiments of the present disclosure, the subject of an additional user input is not limited to the first external device 1400 or the second external device 700, and an additional user input may be received through various user interface (e.g., a display, a microphone or a button) of the first external device 1400 or the second external device 700.

In accordance with various embodiments of the present disclosure, if the second external device 700 operates in conjunction with the cloud server 500, it may transmit a signal, related to a user manipulation input to the second external device 700, to the cloud server 500. The cloud server 500 may receive the signal related to the user manipulation, and may identify third data related to an additional user input based on the signal related to the user manipulation.

Figure 15:
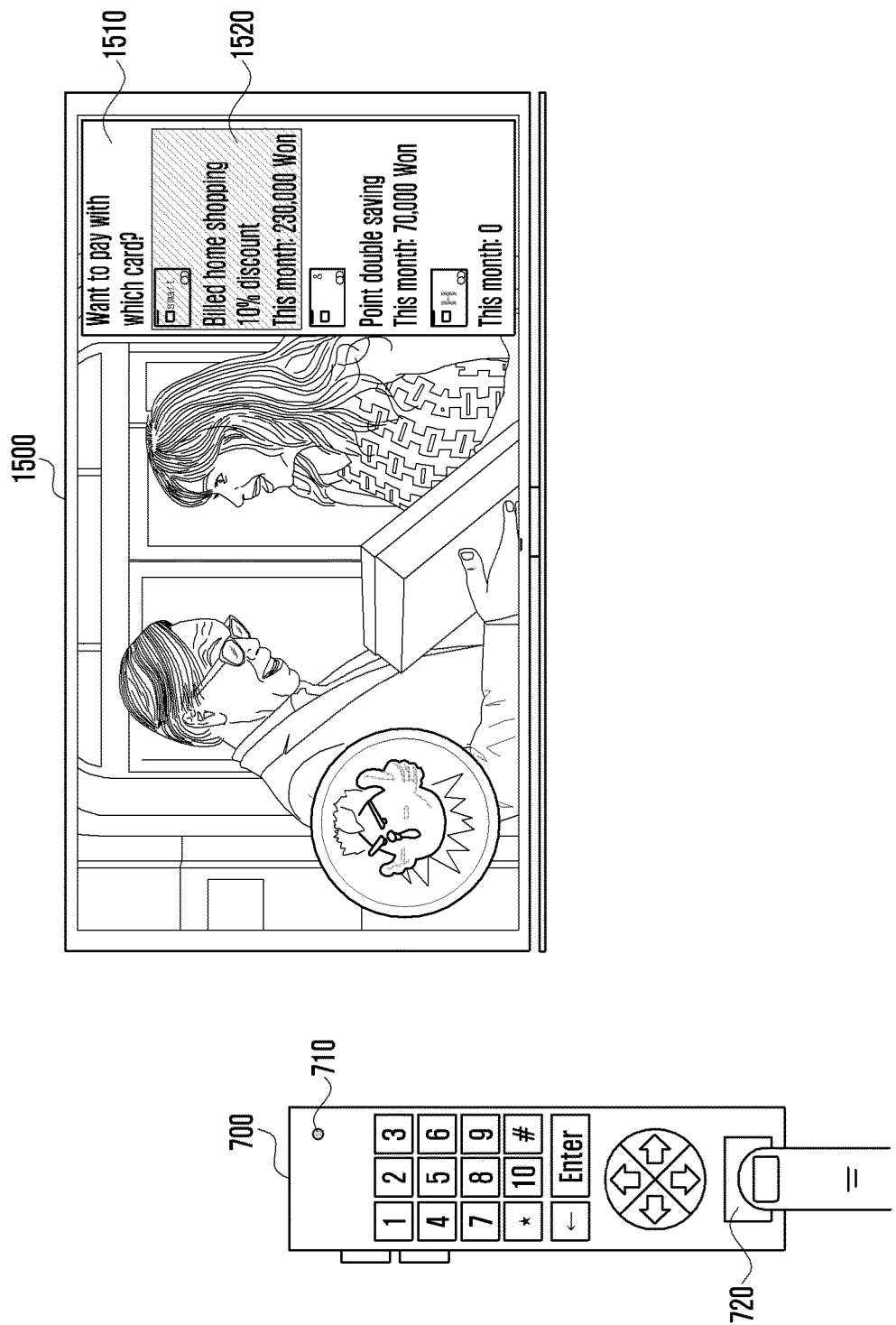

FIG. 15 illustrates an embodiment in which partial landing has occurred due to the omission of some parameters (e.g., the omission of a parameter to select payment means) while processing a user input for online payment. From FIG. 15, it may be seen that a list 1510 of payment means is displayed on the display of a first external device 1500.

The list of payment means and payment means information 1510 may include second data transmitted from the user terminal 100 to the intelligence server 200. The intelligence server 200 may determine to perform an additional user input using the first external device 1500 of external devices 600 based on at least one of the amount of information necessary for an additional parameter input identified by analyzing the second data and information on the size of the display of the external device 1500. In accordance with various embodiments of the present disclosure, the cloud server 500 in addition to the intelligence server 200 may also identify an external device that will perform an additional user input by taking into consideration the characteristics of the external device or the characteristics of a parameter.

A second external device 700 (e.g., the second external device 700 of FIG. 12A) may include various input/output means in order to receive an additional parameter. For example, the second external device 700 may receive a user's voice input because it includes a microphone 710. The received voice input may be used to receive an additional parameter.

In accordance with various embodiments of the present disclosure, the second external device 700 may receive biometric information of a user input by the user. The second external device 700 may include a fingerprint input unit 720 in order to receive the biometric information of the user. Various input methods (e.g., an optical type, an electrical type or ultrasonic-based fingerprint recognition) may be applied to the fingerprint input unit 720. The second external device 700 may control the fingerprint input unit 720 in order to register the user's fingerprint. The second external device 700 may register the user's fingerprint, and may receive a token issued by an intelligence server (e.g., the intelligence server 200 of FIG. 1) or a cloud server (e.g., the cloud server 500 of FIG. 1). When the user registration is completed based on the registered user fingerprint, the second external device 700 may perform user authentication by transmitting the token issued by an intelligence server (e.g., the intelligence server 200 of FIG. 1) or a cloud server (e.g., the cloud server 500 of FIG. 1). After the user authentication is completed, the second external device 700 may perform various tasks while operating in conjunction with the intelligence server 200 or the cloud server 500.

In accordance with various embodiments of the present disclosure, the second external device 700 may receive an accessible token from the intelligence server 200. The second external device 700 may connect a user fingerprint, stored in the memory, and the accessible token.

In accordance with various embodiments of the present disclosure, the second external device 700 may receive a user's fingerprint and perform a task of comparing the received user fingerprint with a registered user fingerprint. If, as a result of the comparison, the received user fingerprint and the registered user fingerprint are substantially identical, the second external device 700 may transmit a token connected to the registered user fingerprint to the intelligence server 200 so that a function related to a user input (e.g., a voice input) can be performed.

In accordance with various embodiments of the present disclosure, the second external device 700 may receive the fingerprint of each of a plurality of users and register the fingerprints of the plurality of users. The second external device 700 may receive a user's fingerprint, and may identify a user who belongs to the plurality of users and who corresponds to the received user fingerprint. The second external device 700 may provide various functions suitable for the identified user.

In accordance with various embodiments of the present disclosure, the second external device 700 may receive a user input for selecting payment means 1520 using a second external device (e.g., the second external device 700 of FIG. 12A) that controls the first external device 1500. The user terminal 100 may perform payment using a user input. For example, the second external device 700 may receive a user input for entering a password number necessary to perform payment using a keypad included in the second external device 700. For another example, the second external device 700 may receive biometric information necessary to perform payment using biometric information acquisition means (e.g., the fingerprint sensor 720) included in the second external device 700. Alternatively, the second external device 700 may receive a user's voice input. The second external device 700 may perform user authentication for payment using the user's voice input.

In accordance with various embodiments of the present disclosure, the second external device 700 may be implemented in various forms. As illustrated in FIGS. 13, 14 and 15, the second external device 700 may be implemented in a remote controller form, but is not limited thereto. The second external device may be implemented in various forms, such as a cylindrical form (e.g., Home™ by Google™, Eco™ by Amazon™, GIGA Genie by KT™, NUGU by SKT™, KaKao Mini by KaKao™ or Wave by Naver™).

Figure 16:
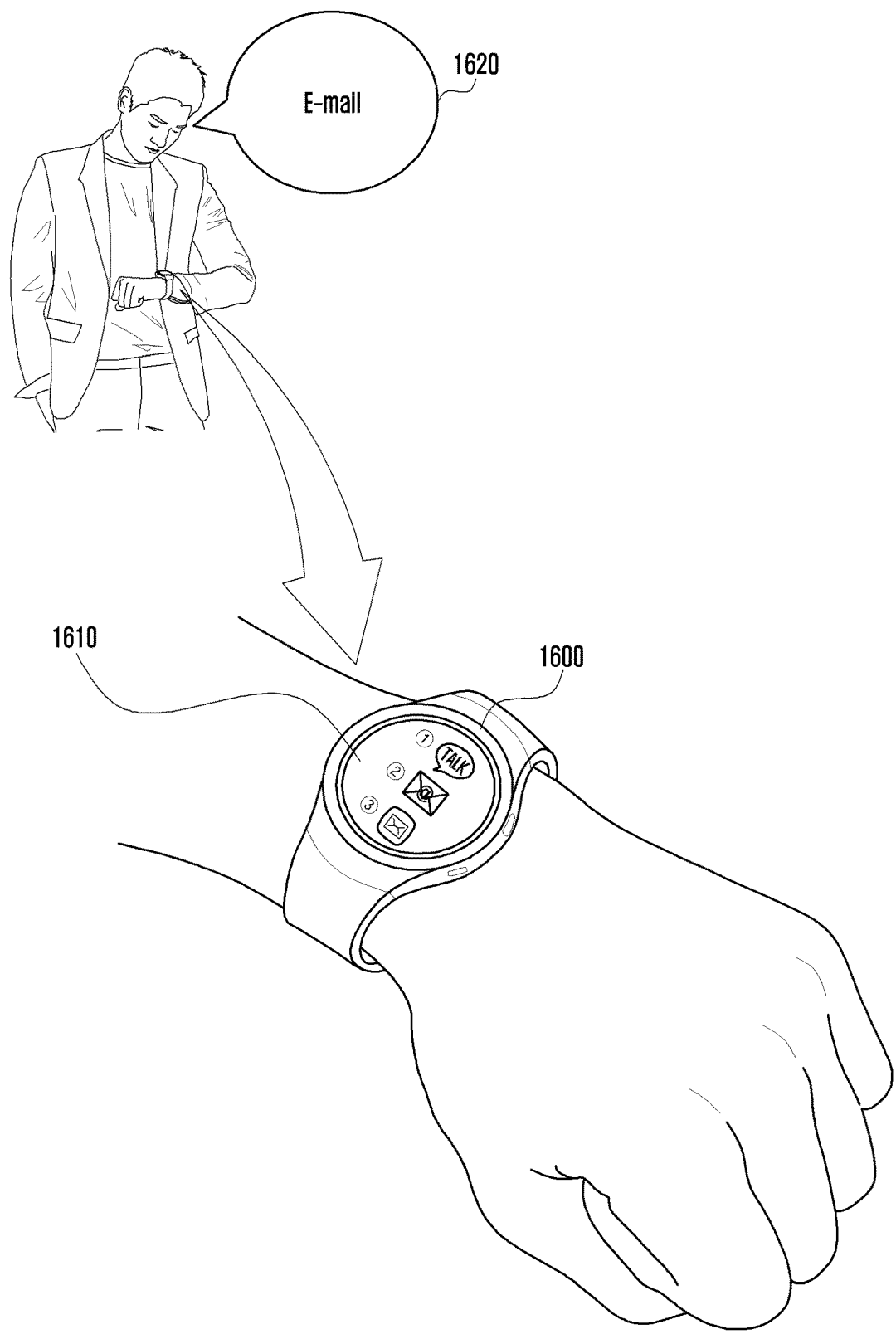

Referring to FIG. 16, an intelligence server (e.g., the intelligence server 200 of FIG. 1) may determine to perform additional user input using a wearable device 1600 of external devices based on at least one of the amount of information necessary for an additional parameter input identified by analyzing second data, information on the size of the display of an external device (e.g., the external device 600 of FIG. 1) and priority of an external device.

In accordance with various embodiments of the present disclosure, the intelligence server 200 may identify an external device that will receive an additional user input for an additional parameter input by taking into consideration priority of external devices. For example, if a user wears the wearable device 1600 frequently, the wearable device 1600 may have higher priority than other external devices. The intelligence server 200 may identify an external device that will receive an additional user input as the wearable device 1600 having higher priority other external devices.

In accordance with various embodiments of the present disclosure, the wearable device 1600 may receive an additional user input through a user's touch on a UI screen 1610 displayed on the display on the wearable device 1600, but may receive the additional user input through a user's voice input 1620.

Figure 17:
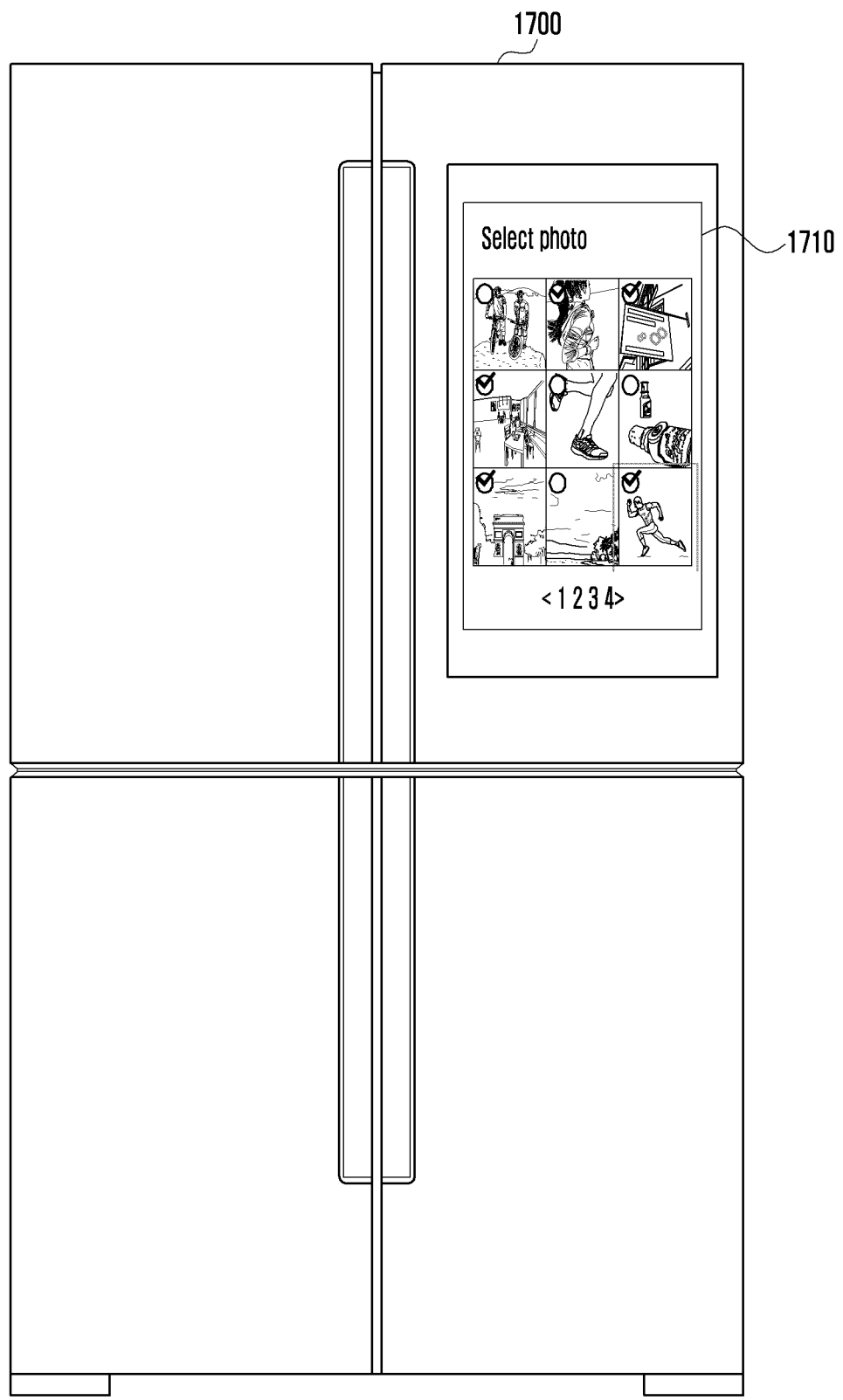

Referring to FIG. 17, an intelligence server (e.g., the intelligence server 200 of FIG. 1) or a cloud server (e.g., the cloud server 500 of FIG. 1) may determine to perform an additional user input using a refrigerator 1700 in the kitchen based on the amount of information necessary for the additional parameter input identified by analyzing second data and a user's current location (e.g., it is identified that the user cooks in the kitchen).

The refrigerator 1700 may receive an additional user input through a touch input to a UI screen 1710 displayed on the display of the refrigerator 1700. The refrigerator 1700 may transmit the additional user input to the cloud server 500 or the intelligence server 200.

Figure 18:
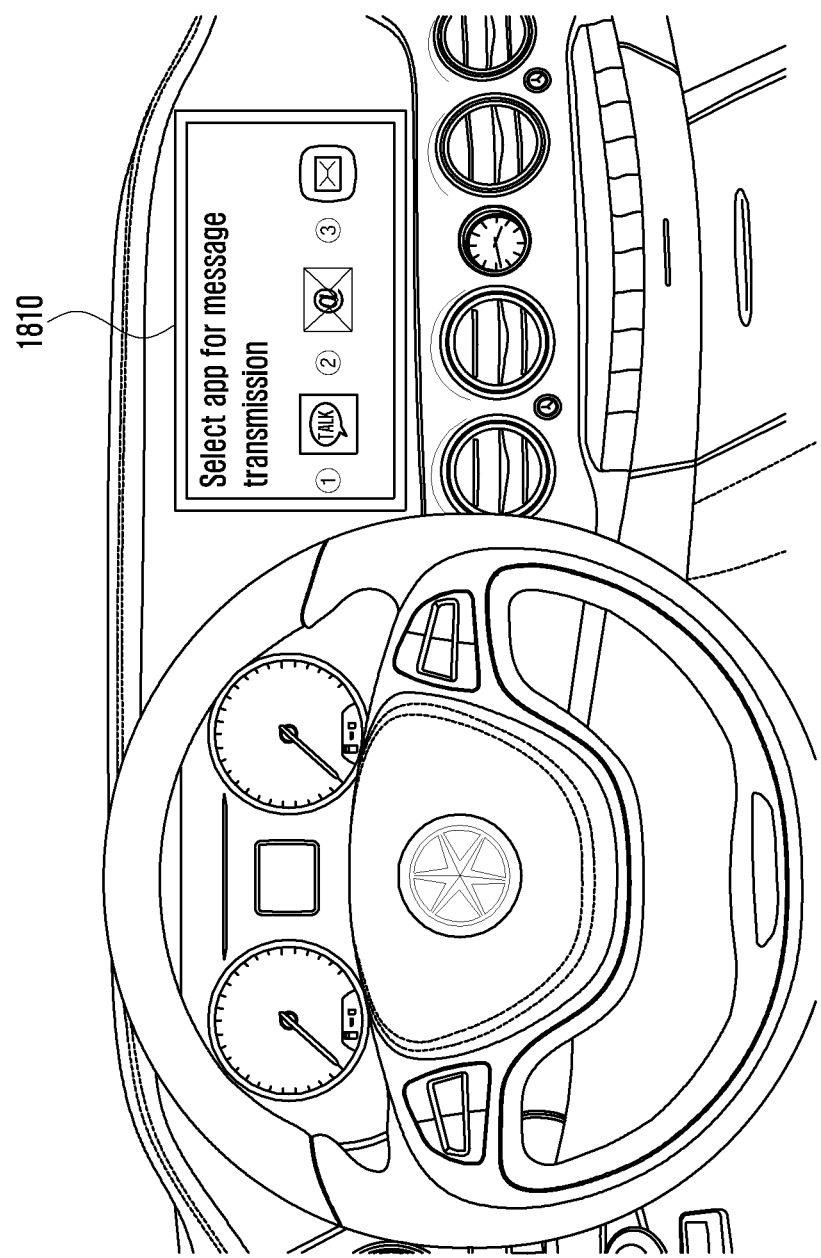
FIG. 18 is a diagram illustrating a method for the electronic device to operate according to various embodiments of the present disclosure.

Referring to FIG. 18, an intelligence server (e.g., the intelligence server 200 of FIG. 1) or a cloud server (e.g., the cloud server 500 of FIG. 1) may determine to perform an additional user input using a display 1810 within a vehicle based on the amount of information necessary for the additional parameter input identified by analyzing second data and a user's pattern (e.g., the pattern of a user who drives at a given time (e.g., office-going hour or closing hour)).

In accordance with various embodiments of the present disclosure, the intelligence server 200 or the cloud server 500 may receive the additional user input through a user's touch input to a UI screen displayed on the display 1810 within the vehicle.

A system according to various example embodiments of the present disclosure includes a network interface comprising network interface circuitry, at least one processor operatively connected to the network interface, and memory operatively connected to the processor. Wherein the memory may store instructions, which when executed by the processor, cause and electronic device of the system to receive first data related to an input including a request for performing a task using a second external device and obtained through a microphone and including information on a user interface of a first external device from the first external device including the microphone through the network interface, to identify the sequence of states of a second external device for executing the task based on at least some of the first data, to transmit first information on the sequence of the states of the second external device to the second external device through the network interface, to receive second data indicative of a need for an additional user input for completing the task from the second external device through the network interface, and to transmit second information to the first external device based on at least some of the second data.

In the system according to various example embodiments of the present disclosure, the user interface of the first external device includes a speaker, but does not include a display. The second information may include text to be output through the speaker.

In the system according to various example embodiments of the present disclosure, the text may include a speech synthesis markup language (SSML).

In the system according to various example embodiments of the present disclosure, the instructions, when executed by the processor cause an electronic device of the system to transmit third information to a third external device including a display through the network interface based on at least some of the second data. The third information may include at least one of an image and text to be displayed on the display.

In the system according to various example embodiments of the present disclosure, the user interface of the first external device may include a display. The second information may include at least one of an image and text to be displayed on the display.

In the system according to various example embodiments of the present disclosure, the instructions when executed by the processor may cause an electronic device of the system to receive data related to the characteristics of the first external device and to identify a device to which the second data is to be output based on the characteristics of the first external device.

In the system according to various example embodiments of the present disclosure, the instructions when executed by the processor may cause an electronic device of the system to generate a user interface for receiving the additional user input for completing the task based on the characteristics of the first external device.

In the system according to various example embodiments of the present disclosure, the instructions when executed by the processor may cause an electronic device of the system to transmit the generated user interface to the first external device.

In the system according to various example embodiments of the present disclosure, the instructions when executed by the processor may cause an electronic device of the system to receive a user's location from the first external device and to identify an external device to which the second data is to be output based on the user's location.

In the system according to various example embodiments of the present disclosure, the instructions when executed by the processor may cause an electronic device of the system to analyze the user input included in the first data and to identify whether the additional user input for completing the task is necessary based on a result of the analysis of the user input.

In the system according to various example embodiments of the present disclosure, the instructions when executed by the processor may cause and electronic device of the system to receive third data related to the additional user input, to identify the sequence of the states of the second external device for executing the task based on the first data and the third data, and to transmit fourth information related to the identified sequence of the states of the second external device to the second external device.

An electronic device according to various example embodiments of the present disclosure includes a network interface comprising network interface circuitry, a microphone, a speaker, at least one processor operatively connected to the network interface, the microphone, and the speaker, and memory operatively connected to the processor. Wherein the memory may store instructions which, when executed by the processor, cause the electronic device to receive a first input including a request to perform a task using an external device through the microphone, to transmit first information related to the first input and including information on a user interface of a first external device to an external server through the network interface, to receive second data indicative of a need for an additional input for completing the task from the external server through the network interface, to provide a voice through the speaker based on at least some of the second data, to receive a second input including the additional input for completing the task through the microphone, and to transmit third data related to the second input to the external server through the network interface.

An electronic device according to various example embodiments of the present disclosure includes a network interface comprising network interface circuitry, a microphone, a speaker, a display, a processor operatively connected to the network interface, the microphone, the speaker, and the display, and memory operatively connected to the processor. Wherein, the memory may store instructions which, when executed by the processor, cause the electronic device to receive a first input including a request to perform a task using an external device through the microphone, to transmit first information related to the first input and including information on a user interface of the first external device to an external server through the network interface, to receive second data indicative of a need for an additional user input for completing the task from the external server, to provide a voice through the speaker and/or provides a graphic user interface (GUI) through the display based on at least some of the second data, to receive a second input including the additional input for completing the task through the microphone or the display, and to transmit third data related to the second input to the external server through the network interface.

An electronic device according to various example embodiments of the present disclosure includes a network interface comprising network interface circuitry, a microphone, a fingerprint sensor, a speaker, a display, a processor operatively connected to the network interface, the microphone, the speaker, and the display, and memory operatively connected to the processor. Wherein, the memory may store instructions which, when executed by the processor, cause the electronic device to receive a first input including a request to perform a task using an external device through the microphone, transmit first information related to the first input and including information on a user interface of the first external device to an external server through the network interface, to receive second data indicative of a need for an additional input for completing the task from the external server, to provide a voice through the speaker and/or provides a graphic user interface (GUI) through the display based on at least some of the second data, to receive biometric information through the fingerprint sensor, to compare the received biometric information with registered biometric information, to receive a second input including the additional input for completing the task through the microphone or the display when the received biometric information and the registered biometric information are determined to be substantially identical, and to transmit third data related to the second input to the external server through the network interface using a token corresponding to the registered biometric information.

Figure 19:
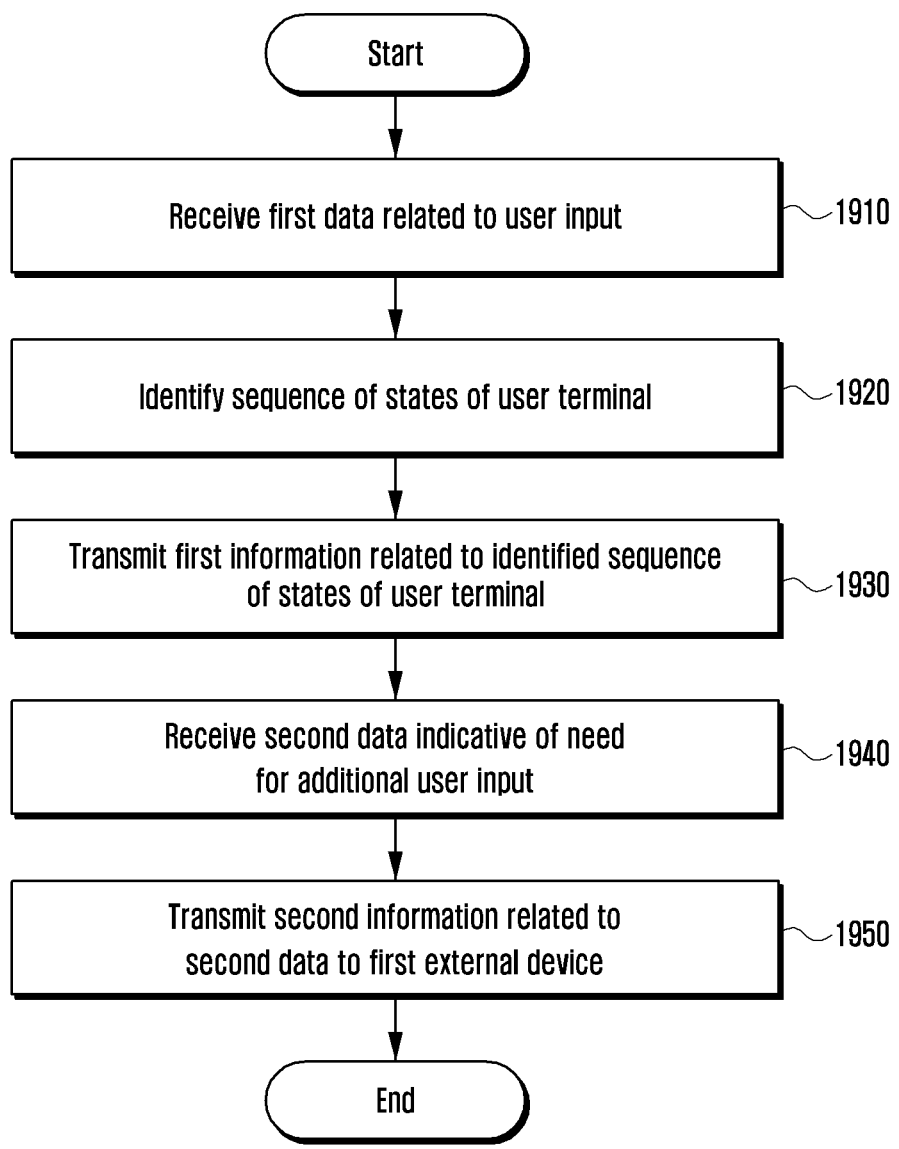
FIG. 19 is a flowchart illustrating a method for the electronic device to operate according to another embodiment of the present disclosure.

FIG. 19 is a flowchart illustrating a method for the electronic device to operate according to another embodiment of the present disclosure.

At operation 1910, a system (e.g., the intelligence server 200 of FIG. 1) according to an embodiment may receive first data related to a user input.

In accordance with various embodiments of the present disclosure, the user input may include a user's voice input obtained by a first external device (e.g., the first external device 600 of FIG. 1) through a microphone.

In accordance with various embodiments of the present disclosure, the first data may include information on a user interface of the first external device 600. The information on the user interface of the first external device 600 may refer, for example, to information on various means capable of outputting information to a user or various means (e.g., a display, a speaker or a microphone) by which a user can perform an input.

At operation 1920, the system 200 according to an embodiment may identify the sequence of states (path rule) of a user terminal (e.g., the user terminal 100 of FIG. 1). The sequence of states of the user terminal 100 may refer, for example, to an execution sequence for performing a task to be performed in the user terminal 100.

At operation 1930, the system 200 according to an embodiment may transmit first information related to the sequence of states of the user terminal 100 to the user terminal 100. The user terminal 100 may perform the task based on the first information, and may identify that a parameter necessary for the execution of the task has been omitted during the execution of the task. If a parameter is insufficient, the user terminal 100 may transmit second data indicative of a need for a user input for an additional parameter input.

At operation 1940, the system (e.g., 200 of FIG. 1) according to an embodiment may receive the second data. At operation 1950, the system 200 may transmit second information related to the second data to the first external device 600.

Figure 20:
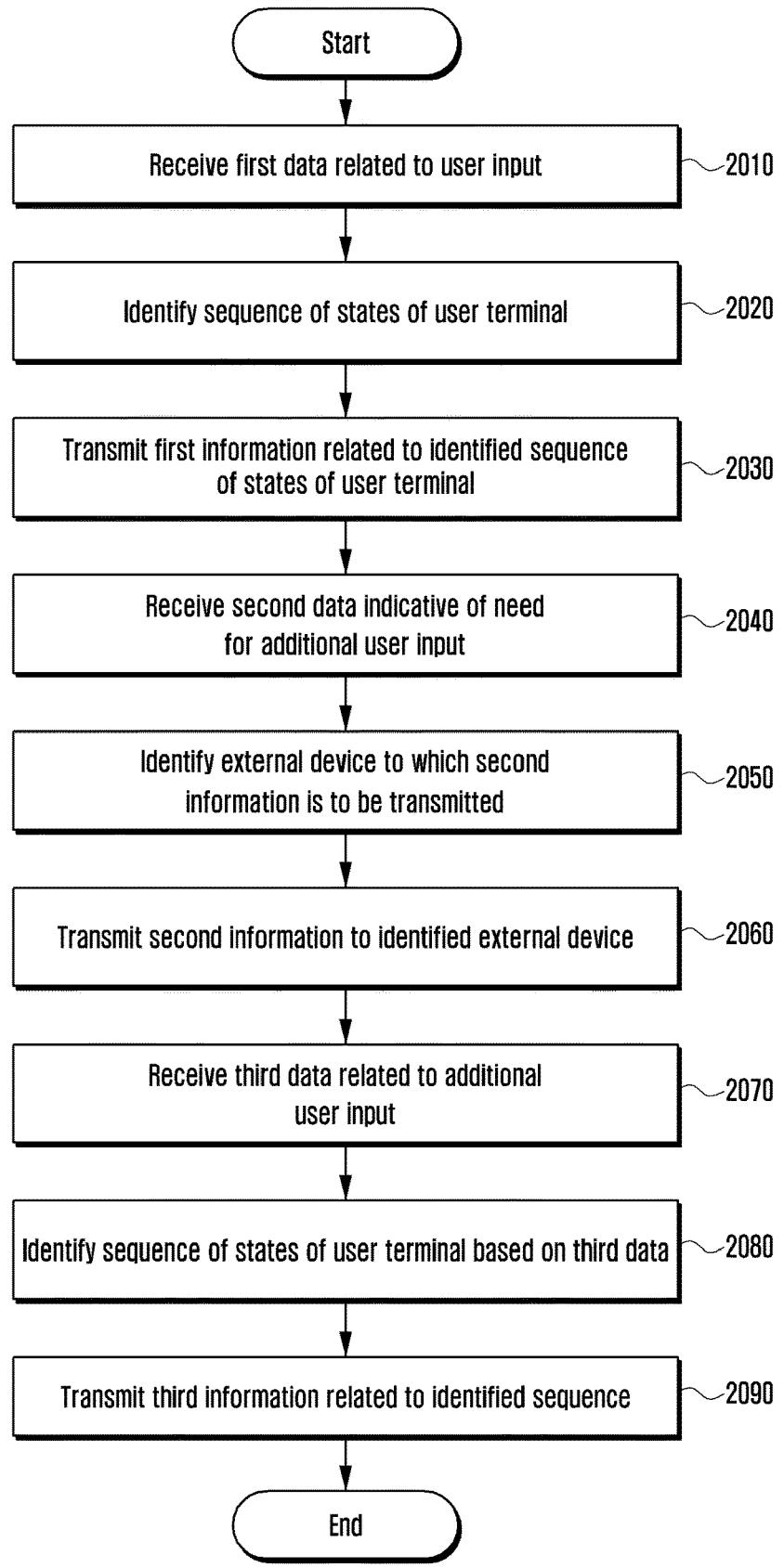
FIG. 20 is a flowchart illustrating a method for an electronic device to operate according to another embodiment of the present disclosure.

FIG. 20 is a flowchart illustrating a method for an electronic device to operate according to another embodiment of the present disclosure.

At operation 2010, a system (e.g., the intelligence server 200 of FIG. 1) according to an embodiment may receive first data related to a user input.

In accordance with various embodiments of the present disclosure, the user input may include a user's voice input obtained through the microphone of a first external device (e.g., the first external device 600 of FIG. 1).

In accordance with various embodiments of the present disclosure, the first data may include information on a user interface of the first external device 600. The information on the user interface of the first external device 600 may refer, for example, to information on various means capable of outputting information to a user or various means (e.g., a display, a speaker or a microphone) capable of receiving information from a user.

At operation 2020, the system 200 according to an embodiment may identify the sequence of states (path rule) of a user terminal (e.g., the user terminal 100 of FIG. 1). The sequence of states of the user terminal 100 may refer, for example, to an execution sequence for executing a task to be executed in the user terminal 100.

At operation 2030, the system 200 according to an embodiment may transmit first information related to the sequence of states of the user terminal to the user terminal 100. The user terminal 100 may execute the task based on the first information, and may identify that a parameter necessary for the task has been omitted during the execution of the task. If a parameter is insufficient, the user terminal 100 may transmit second data indicating that a user input for an additional parameter input is necessary to the system 200.

At operation 2040, the system 200 according to an embodiment may receive the second data transmitted by the user terminal 100.

At operation 2050, the system 200 according to an embodiment may identify an external device that will transmit second information related to the received second data. In accordance with various embodiments of the present disclosure, the system 200 may identify an external device that will transmit the second information based on at least some of the amount of information necessary for an additional parameter input identified by analyzing the second data, information on the first external device 600, information on the location of a user, and priority of the first external device 600.

At operation 2060, the system 200 according to an embodiment may transmit the second information to the identified external device 600. In accordance with various embodiments of the present disclosure, the second information may include a user interface related to the additional user input or information on an additional parameter.

In accordance with various embodiments of the present disclosure, the system 200 may differently generate the user interface related to the additional user input based on the characteristics of the first external device 600. For example, if the first external device 600 does not include a display, the system 200 may generate a user interface related to an additional user input including elements other than a visual element. For example, if the first external device 600 includes a display, but does not include a microphone, the system 200 may generate a user interface related to an additional user input including elements other than an acoustic element.

At operation 2070, the system 200 according to an embodiment may receive third data related to the additional user input from the first external device 600.

At operation 2080, the system 200 according to an embodiment may identify the sequence of states (path rule) of the user terminal 100 based on the third data.

At operation 2090, the system 200 according to an embodiment may transmit third information related to the identified sequence to the user terminal 100. The user terminal 100 may execute a task corresponding to the user input based on the identified sequence included in the third information.

A method of operating an electronic device according to various example embodiments of the present disclosure may include operations of receiving first data related to an input including a request for performing a task using a second external device and obtained through a microphone and including information on a user interface of a first external device from the first external device including the microphone through a network interface, identifying a sequence of states of a second external device for executing the task based on at least some of the first data, transmitting first information on the sequence of the states of the second external device to the second external device through the network interface, receiving second data indicative of a need for an additional input for completing the task from the second external device through the network interface, and transmitting second information to the first external device based on at least some of the second data.

In the method for operating the electronic device according to various example embodiments of the present disclosure, the user interface of the first external device includes a speaker, but does not may include a display. The second information may include text to be output through the speaker.

The method of operating the electronic device according to various example embodiments of the present disclosure further includes an operation of transmitting third information to a third external device including a display through the network interface based on the second data. The third information may include at least one of an image and text to be displayed on the display.

The method of operating the electronic device according to various example embodiments of the present disclosure may further include operations of receiving data related to characteristics of the first external device and identifying a device to which the second data is to be output based on the characteristics of the first external device.

The method of operating the electronic device according to various example embodiments of the present disclosure may further include an operation of generating a user interface for receiving the additional input for completing the task based on the characteristics of the first external device.

The method of operating the electronic device according to various example embodiments of the present disclosure may further include an operation of identifying an external device to which the second data is to be output based on the location of a user of the first external device.

The method of operating the electronic device according to various example embodiments of the present disclosure may further include operations of receiving third data related to the additional user input, identifying the sequence of the states of the second external device for executing the task based on the first data and the third data, and transmitting fourth information related to the identified sequence of the states of the second external device to the second external device.

In the electronic device performing an operation using a voice command and the method for the electronic device to operate according to various example embodiments of the present disclosure, an electronic device can be controlled through a voice command although an electronic device that has received a voice command and an electronic device to be controlled based on the voice command are different and far away from each other.

In the electronic device performing an operation using a voice command and the method for the electronic device to operate according to various example embodiments of the present disclosure, when an additional parameter input is required, an external device capable of performing the additional parameter input can be identified by taking into consideration the characteristics of external devices and a user's location.

In the electronic device performing an operation using a voice command and the method for the electronic device to operate according to various example embodiments of the present disclosure, various feedbacks for a process of processing a voice command can be provided to a user because after a voice command is first performed using a parameter, a deficient parameter is additionally received and the voice command is processed.

The method above is described with reference to flowcharts, methods, and computer program products according to various example embodiments of the disclosure. It will be understood that each block of the flowcharts, and combinations of blocks in the flowcharts, may be implemented by computer program instructions. The computer program instructions may be provided to a processor of a general purpose computer, special purpose computer, and/or other programmable data processing apparatus, or the like, to produce a machine, such that the instructions, which are executed via the processor of the computer or other programmable data processing apparatus, create means for implementing the functions specified in the flowchart block or blocks. The computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Each block of the flowcharts may represent a module, a segment, or a portion of code, which includes one or more executable instructions for implementing the specified logical function(s). It should also be noted that in some alternative implementations, the functions noted in the blocks may occur out of order. For example, two blocks shown in succession may, in fact, be executed substantially concurrently or the blocks may sometimes be executed in the reverse order, depending upon the functionality involved.

Certain aspects of the disclosure may also be embodied as computer readable code on a non-transitory computer readable recording medium. A non-transitory computer readable recording medium is any data storage device that may store data which may be thereafter read by a computer system. Examples of a non-transitory computer readable recording medium include a ROM, a RAM, compact disc-ROMs (CD-ROMs), magnetic tapes, floppy disks, and optical data storage devices. A non-transitory computer readable recording medium may also be distributed over network coupled computer systems so that computer readable code is stored and executed in a distributed fashion. In addition, functional programs, code, and code segments for accomplishing the disclosure may be easily construed by programmers skilled in the art to which the disclosure pertains.

Embodiments of the disclosure may involve the processing of input data and the generation of output data to some extent. The input data processing and output data generation may be implemented in hardware and/or software in combination with hardware. For example, certain electronic components may be employed in a mobile device or similar or related circuitry for implementing the functions associated with the various embodiments of the disclosure. Alternatively, one or more processors operating in accordance with stored instructions may implement the functions associated with the various embodiments of the disclosure. If such is the case, it is within the scope of the disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the disclosure may be easily construed by programmers skilled in the art to which the disclosure pertains.

Aspects of the various embodiments of the disclosure may be implemented in hardware, firmware and/or via the execution of software or computer code that may be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods of the disclosure may be rendered via such software that is stored on the recording medium using a general purpose computer, or a special processor or in programmable or dedicated hardware, such as an ASIC or an FPGA, or the like. As would be understood in the art, a computer, a processor, a microprocessor controller or programmable hardware include memory components, e.g., RAM, ROM, flash memory, etc. that may store or receive software or computer code that when accessed and executed by the computer, the processor or the hardware implement the methods of the disclosure.

While the disclosure has been illustrated and described with reference to various example embodiments thereof, it will be understood by those skilled in the art that various changes in form and details may be made therein without departing from the spirit and scope of the disclosure as defined by the appended claims and their equivalents.

What is claimed is:

1. A system, comprising:
   a network interface comprising network interface circuitry;
   at least one processor operatively connected to the network interface; and
   a memory operatively connected to the processor,
   wherein when the memory stores instructions which, when executed by the processor, cause an electronic device of the system to:
   receive first data related to an input comprising a request for performing a task using a second external device and obtained through a microphone and comprising information on a user interface of a first external device from the first external device comprising the microphone through the network interface,
   identify a sequence of states of the second external device for executing the task based on at least some of the first data,
   transmit first information on the sequence of states of the second external device to the second external device through the network interface,
   receive second data indicative of a need for an additional input for completing the task from the second external device through the network interface, and
   transmit second information to the first external device based on at least some of the second data.

2. The system of claim 1, wherein:
   the user interface of the first external device comprises a speaker, and does not include a display, and the second information comprises text to be output through the speaker.

3. The system of claim 2, wherein the text comprises a speech synthesis markup language (SSML).

4. The system of claim 1, wherein:
the instructions, when executed by the processor, cause an electronic device of the system to transmit third information to a third external device comprising a display through the network interface based on at least some of the second data, and
the third information comprises at least one of an image and text to be displayed on the display.

5. The system of claim 1, wherein:
the user interface of the first external device comprises a display, and
the second information comprises at least one of an image and text to be displayed on the display.

6. The system of claim 1, wherein the instructions, when executed by the processor, cause an electronic device of the system to receive data related to characteristics of the first external device and to identify a device to which the second data is to be output based on the characteristics of the first external device.

7. The system of claim 6, wherein the instructions, when executed the processor, cause an electronic device of the system to generate a user interface for receiving the additional input for completing the task based on the characteristics of the first external device.

8. The system of claim 7, wherein the instructions, when executed by the processor, cause an electronic device of the system to transmit the generated user interface to the first external device.

9. The system of claim 6, wherein the instructions, when executed by the processor, cause an electronic device of the system to receive a location from the first external device and to identify an external device to which the second data is to be output based on the location.

10. The system of claim 1, wherein the instructions, when executed by the processor, cause an electronic device of the system to analyze the input included in the first data and to identify whether the additional input for completing the task is necessary based on a result of the analysis of the input.

11. The system of claim 1, wherein the instructions, when executed by the processor, cause an electronic device of the system to receive third data related to the additional input, to identify the sequence of states of the second external device for executing the task based on the first data and the third data, and to transmit fourth information related to the identified sequence of states of the second external device to the second external device.

12. A method of operating an electronic device, the method comprising:
receiving first data related to an input comprising a request for performing a task using a second external device and obtained through a microphone and comprising information on a user interface of a first external device from the first external device comprising the microphone through a network interface;
identifying a sequence of states of the second external device for executing the task based on at least some of the first data;
transmitting first information on the sequence of states of the second external device to the second external device through the network interface;
receiving second data indicative of a need for an additional input for completing the task from the second external device through the network interface, and
transmitting second information to the first external device based on at least some of the second data.

13. The method of claim 12, wherein:
the user interface of the first external device comprises a speaker, and does not include a display, and
the second information comprises text to be output through the speaker.

14. The method of claim 12, further comprising:
transmitting third information to a third external device comprising a display through the network interface based on the second data,
wherein the third information comprises at least one of an image and text to be displayed on the display.

15. The method of claim 12, further comprising:
receiving data related to characteristics of the first external device; and
identifying a device to which the second data is to be output based on the characteristics of the first external device.

16. The method of claim 15, further comprising:
generating a user interface for receiving the additional input for completing the task based on the characteristics of the first external device.

17. The method of claim 12, further comprising:
identifying an external device to which the second data is to be output based on a location of a user of the first external device.

18. The method of claim 12, further comprising:
receiving third data related to the additional input;
identifying the sequence of the states of the second external device for executing the task based on the first data and the third data; and
transmitting fourth information related to the identified sequence of the states of the second external device to the second external device.

* * * * *